US009026301B2

(12) United States Patent
Zini et al.

(10) Patent No.: US 9,026,301 B2
(45) Date of Patent: May 5, 2015

(54) ROBOTIC ORDERING AND DELIVERY SYSTEM SOFTWARE AND METHODS

(75) Inventors: Aldo Zini, Venetia, PA (US); Spencer Wayne Allen, Wexford, PA (US); Barry Mark Skirble, Allison Park, PA (US); Henry F. Thorne, Pittsburgh, PA (US); Stuart Fairley, Pittsburgh, PA (US)

(73) Assignee: Aethon, Inc., Pittsburgh, PA (US)

( * ) Notice: Subject to any disclaimer, the term of this patent is extended or adjusted under 35 U.S.C. 154(b) by 1837 days.

(21) Appl. No.: 11/581,798

(22) Filed: Oct. 16, 2006

(65) Prior Publication Data

US 2007/0112461 A1 May 17, 2007

Related U.S. Application Data

(60) Provisional application No. 60/727,280, filed on Oct. 14, 2005.

(51) Int. Cl.
*G05B 15/00* (2006.01)
*G06F 19/00* (2011.01)
*G05D 1/02* (2006.01)
*A61G 12/00* (2006.01)
*G05B 19/418* (2006.01)

(52) U.S. Cl.
CPC ........ *G05D 1/0274* (2013.01); *G05B 19/41895* (2013.01); *G05B 2219/31003* (2013.01); *G05B 2219/31006* (2013.01); *G05B 2219/31007* (2013.01); *G05D 1/0225* (2013.01); *G05D 1/0227* (2013.01); *G05D 1/0238* (2013.01); *G05D 1/024* (2013.01); *G05D 1/0242* (2013.01); *G05D 1/0246* (2013.01); *G05D 1/0255* (2013.01); *G05D 1/028* (2013.01); *G05D 2201/0206* (2013.01); *Y10S 901/01* (2013.01)

(58) Field of Classification Search
USPC ................ 318/587, 568–11, 568.12, 568.16; 700/245, 253, 258, 260; 701/23–27; 901/1
See application file for complete search history.

(56) References Cited

U.S. PATENT DOCUMENTS

| 4,279,563 | A | * | 7/1981 | Miller ........................... 414/611 |
|---|---|---|---|---|
| 4,483,407 | A | | 11/1984 | Iwamoto et al. |
| 4,674,048 | A | | 6/1987 | Okumura |
| 4,746,977 | A | | 5/1988 | White |
| 4,750,123 | A | | 6/1988 | Christian |

(Continued)

OTHER PUBLICATIONS

"HelpMate® Trackless Robotic Courier", Pyxis Corporation, Product Brochure.

(Continued)

*Primary Examiner* — Khoi Tran
*Assistant Examiner* — Dale Moyer
(74) *Attorney, Agent, or Firm* — Buchanan Ingersoll & Rooney PC

(57) ABSTRACT

Systems, methods and devices for the automated delivery of goods form one to another using a robotic tug and accompanying cart. A computer within the tug or cart stores an electronic map of the building floor plan and intended paths for the tug to take when traversing from one location to the next. During the delivery, a variety of different sensors and scanners gather data that is used to avoid obstacles and/or adjust the movement of the tug in order to more closely follow the intended path. The system preferably includes both wired and wireless networks that allow one or more tugs to communicate with a tug base station, a primary network located at the site of the delivery and a remote host center that monitors the status and data collected by the tugs.

21 Claims, 18 Drawing Sheets

(56) References Cited

U.S. PATENT DOCUMENTS

| | | | |
|---|---|---|---|
| 4,800,977 A | 1/1989 | Boegli et al. | |
| 4,816,998 A | 3/1989 | Ahlbom | |
| 4,847,769 A | 7/1989 | Reeve | |
| 4,875,172 A | 10/1989 | Kanayama | |
| 4,944,357 A | 7/1990 | Wible et al. | |
| 5,086,535 A * | 2/1992 | Grossmeyer et al. | 15/319 |
| 5,170,352 A | 12/1992 | McTamaney et al. | |
| 5,175,480 A | 12/1992 | McKeefery et al. | |
| 5,276,618 A | 1/1994 | Everett, Jr. | |
| 5,315,517 A | 5/1994 | Kawase et al. | |
| 5,324,948 A | 6/1994 | Dudar et al. | |
| 5,350,033 A | 9/1994 | Kraft | |
| 5,367,458 A * | 11/1994 | Roberts et al. | 701/25 |
| 5,402,344 A | 3/1995 | Reister et al. | |
| 5,446,356 A | 8/1995 | Kim | |
| 5,461,292 A | 10/1995 | Zondlo | |
| 5,487,009 A | 1/1996 | Hill | |
| 5,488,277 A | 1/1996 | Nishikawa et al. | |
| 5,515,934 A | 5/1996 | Davis | |
| 5,535,843 A | 7/1996 | Takeda et al. | |
| 5,545,960 A | 8/1996 | Ishikawa | |
| 5,548,511 A | 8/1996 | Bancroft | |
| 5,548,512 A | 8/1996 | Quraishi | |
| 5,559,696 A | 9/1996 | Borenstein | |
| 5,652,489 A | 7/1997 | Kawakami | |
| 5,680,306 A | 10/1997 | Shin et al. | |
| 5,684,696 A | 11/1997 | Rao et al. | |
| 5,687,294 A | 11/1997 | Jeong | |
| 5,709,007 A | 1/1998 | Chiang | |
| 5,739,657 A | 4/1998 | Takayama et al. | |
| 5,764,014 A | 6/1998 | Jakeway et al. | |
| 5,819,008 A | 10/1998 | Asama et al. | |
| 5,819,863 A | 10/1998 | Zollinger et al. | |
| 5,867,800 A | 2/1999 | Leif | |
| 5,908,466 A | 6/1999 | Veugen et al. | |
| 5,916,285 A | 6/1999 | Alofs et al. | |
| 5,942,869 A | 8/1999 | Katou et al. | |
| 6,038,501 A | 3/2000 | Kawakami | |
| 6,041,274 A | 3/2000 | Onishi et al. | |
| 6,046,565 A | 4/2000 | Thorne | |
| 6,246,930 B1 | 6/2001 | Hori | |
| 6,272,405 B1 | 8/2001 | Kubota | |
| 6,308,118 B1 | 10/2001 | Holmquist | |
| 6,314,341 B1 | 11/2001 | Kanayama | |
| 6,338,013 B1 | 1/2002 | Ruffner | |
| 6,360,165 B1 | 3/2002 | Chowdhary | |
| 6,370,453 B2 | 4/2002 | Sommer | |
| 6,374,155 B1 * | 4/2002 | Wallach et al. | 700/245 |
| 6,385,515 B1 | 5/2002 | Dickson et al. | |
| 6,442,476 B1 | 8/2002 | Poropat | |
| 6,445,983 B1 | 9/2002 | Dickson et al. | |
| 6,446,005 B1 | 9/2002 | Bingeman et al. | |
| 6,453,223 B1 | 9/2002 | Kelly et al. | |
| 6,454,036 B1 | 9/2002 | Airey et al. | |
| 6,459,955 B1 | 10/2002 | Bartsch et al. | |
| 6,459,966 B2 | 10/2002 | Nakano et al. | |
| 6,496,755 B2 * | 12/2002 | Wallach et al. | 700/245 |
| 6,502,017 B2 | 12/2002 | Ruffner | |
| 6,523,629 B1 * | 2/2003 | Buttz et al. | 180/167 |
| 6,580,246 B2 * | 6/2003 | Jacobs | 318/568.16 |
| 6,584,375 B2 * | 6/2003 | Bancroft et al. | 700/213 |
| 6,629,735 B1 | 10/2003 | Galy | |
| 6,667,592 B2 * | 12/2003 | Jacobs et al. | 318/568.12 |
| 6,946,565 B2 | 9/2005 | Fedouloff et al. | |
| 7,100,725 B2 | 9/2006 | Thorne | |
| 2002/0095239 A1 * | 7/2002 | Wallach et al. | 700/245 |
| 2002/0165638 A1 * | 11/2002 | Bancroft et al. | 700/213 |
| 2002/0165790 A1 * | 11/2002 | Bancroft et al. | 705/26 |
| 2002/0173877 A1 * | 11/2002 | Zweig | 700/245 |
| 2003/0030398 A1 | 2/2003 | Jacobs et al. | |
| 2003/0030399 A1 * | 2/2003 | Jacobs | 318/568.16 |
| 2003/0165373 A1 * | 9/2003 | Felder et al. | 414/331.07 |
| 2003/0212472 A1 * | 11/2003 | McKee | 700/245 |
| 2003/0233177 A1 * | 12/2003 | Johnson et al. | 701/23 |
| 2004/0002283 A1 | 1/2004 | Herbert et al. | |
| 2004/0010337 A1 * | 1/2004 | Mountz | 700/214 |
| 2004/0073337 A1 | 4/2004 | McKee et al. | |
| 2004/0093650 A1 | 5/2004 | Martins et al. | |
| 2004/0111184 A1 * | 6/2004 | Chiappetta et al. | 700/245 |
| 2004/0195012 A1 | 10/2004 | Song et al. | |
| 2004/0204792 A1 | 10/2004 | Taylor et al. | |
| 2005/0029029 A1 | 2/2005 | Thorne | |
| 2005/0131645 A1 | 6/2005 | Panopoulos | |
| 2010/0223031 A1 * | 9/2010 | Vincent et al. | 703/1 |
| 2012/0173018 A1 * | 7/2012 | Allen et al. | 700/245 |

OTHER PUBLICATIONS

Canadian Office Action, dated Mar. 18, 2014, of the corresponding Canadian Patent Application No. 2,625,895 (3 pages).
Canadian Office Action, dated Oct. 31, 2014, of the corresponding Canadian Patent Application No. 2,625,895 (2 pages).

* cited by examiner

ROBOTIC ORDERING AND DELIVERY SYSTEM SOFTWARE AND METHODS

CROSS-REFERENCE TO RELATED APPLICATION

This application claims the benefit under 35 U.S.C. §119 (e) of the earlier filing date of U.S. Provisional Application Ser. No. 60/727,280 filed on Oct. 14, 2005.

BACKGROUND OF THE INVENTION

1. Field of the Invention

The present invention relates generally to robotic retrieval/delivery devices and methods of using the same, and, more particularly, the present invention is directed to software and methods for use with asset ordering, tracking and delivery utilizing an autonomous robotic tug and cart.

2. Description of the Background

Robotic and automated vehicles for delivering or transporting materials indoors have been developed and utilized in a number of very specialized applications. For example, several attempts have been made to design and use a mail delivery robot that makes regular stops to make deliveries on a somewhat regular basis. Likewise, one or more attempts at using an unmanned robot to push or pull a cart around a predefined circuit have also been contemplated. However, rather than being an independent (i.e., autonomous) vehicle, these robots are typically automated guided vehicles that follow a predefined track such as an ultraviolet track painted on the ground, a hidden guide wire or some other means of providing a predefined path for the vehicle.

In many different pursuits, delivery tasks are repeated on a daily if not hourly basis. Even in the relatively defined space of enclosed buildings, there are an almost limitless number of applications where people are used to perform repeated delivery tasks that require little or no critical thinking on a day-to-day basis. For example, in a hospital setting, hospital employees spend an exceedingly large amount of time pushing carts around the hospital and delivering small goods to various locations throughout the hospital. No matter which employee undertakes these errands, high cost human resources are being wasted on tasks that could be automated. Heretofore, however, no cost-effective solution to this delivery problem has been available.

Certain previous robots have been designed to address the problem of navigation and tracking the position of a robot as it travels in an indoor environment. For example, U.S. Pat. No. 7,100,725, which is assigned to the owners of the present invention and is incorporated herein by reference in its entirety, describes certain features of a robotic cart pulling vehicle that address the navigation and location problem. However, there are many other aspects of utilizing such a robotic device that are not addressed therein.

Another example of prior art systems include a class of mobile robotic devices that navigate based on predefined linear movement commands. For example, to move from one location to another, the device may attempt to execute commands to: (a) move 10 feet forward; (b) turn left; and (c) move 8 feet forward. While these navigation methodologies are useful, they introduce a high degree of positional error. As additional movement commands are carried out, additional error enters the process. As such, an autonomous delivery system in which sensors are used to constantly confirm/update positional accuracy is sought in this art.

In addition to simply navigating the terrain, a preferred robotic retrieval/delivery system would include a variety of different features and characteristics, none of which have been included in combination in previous robotic tug/cart systems. For example, the robotic tug should include a variety of different redundant sensors that allow it to detect potential obstacles before impact and to confirm positional accuracy to a high degree. The tug should also include certain visual and audible cues as to its current and next intended actions in order to more seamlessly coexist in an environment dominated by humans.

In varied environments, the robotic tug system should provide solutions to work around and through certain commonly encountered obstacles. For example, the robotic tug and cart should be able to move from one floor to another in a multi-story building. The device should be able to manipulate automatic doors or otherwise complete delivery tasks when faced with closed doors. These and other "non-ideal" aspects of real world environments have not heretofore been appropriately addressed by existing robotic applications.

A robotic tug delivery system should also provide a variety of different communication and interface options for all levels of users of the system. For example, as the robotic tug moves, it is desirable to have the tug remain in communication with computers at its present location. Moreover, it would be beneficial to allow for broadband communication to a remote host, for example an entity that oversees the implementation and monitoring of robotic tugs at a variety of different physical locations at the same time.

The present invention, in its preferred embodiments, addresses the above-mentioned limitations of the prior art by providing a cost-effective alternative to employees pushing carts to make deliveries of various goods. Specifically, the present invention provides specialized software tools for use with autonomous robotic retrieval/delivery devices. Moreover, although many aspects of the present invention will be described with reference to a preferred embodiment in a hospital setting (a particularly good application of the present invention), the invention may be applied to a wide variety of delivery-related tasks in many alternative environments within the scope of the present invention.

SUMMARY OF THE INVENTION

In accordance with at least one preferred embodiment, the present invention provides systems and methods for utilizing a robotic tug and attached cart to retrieve/deliver one or more goods from/to a variety of different locations. Using a touch screen or other wed-enabled interface, a predefined schedule and/or simple controls, a user can send the robotic device off to another location with a payload onboard the cart. Through sophisticated path planning, sensing, path adjustment and communication, the device is able to navigate a path to the desired destination and carry out a variety of tasks.

The present tug/cart devices are preferably used within a flexible system. The tug or tugs along with a variety of different carts are put in place at a primary location within which the retrieval/delivery system is to be utilized. Each of the robotic devices is associated with a docking station that provides docking functionality for the one or more robotic tugs including recharging the batteries within the tug, downloading any collected data and or aiding in the performance of a diagnostic self-check of the tug and/or providing a convenient interface (e.g., a touch screen) with which a user can select a desired destination. One of the docking stations may also be the main "home base" station which provides a communicating access point between all of the robotic devices and docking stations and the other system components.

In certain embodiments, the system exists as a series of interconnected wired and/or wireless data networks. For example, the primary location (e.g., where deliveries take place) may have an existing computer network. According to the present invention, a computer is installed with a network card to connect with that existing network as well as to communicate with the one or more tugs actually making the deliveries. Additionally, a remote host or remote service center may monitor and/or provide support for the system by interconnecting with the primary network, e.g., through the Internet.

The tugs for use with the present invention preferably include a variety of different obstruction detection and position-determining sensors. For example, a network of overlapping and forward-looking infrared sensors may be used for long range directional object detection. Moreover, a forward-looking sonar may be used for near field fidelity and additional infrared or other sensors may be used to detect certain other features. Scanning lasers or additional one-dimensional light sensors may also be utilized in various applications. The robotic device uses this sensor information to detect and compute its current position and orientation with respect to its intended path, and signals are sent to its independent motors to adjust the steering along that path to avoid an obstacle or re-orient itself with the intended path.

Since many indoor environments include various types of impediments in normal operation, the present system preferably addresses one or more of these impediments. For example, in order to move from one floor of a building to another, an elevator control panel and algorithm is used to empty and then take over the operation of an elevator. Likewise, an annunciator may be used to audibly/visually alert a user that a robotic device is approaching when the designated delivery point is behind a closed door. Finally, an automated door opening interface or email/text/pager system may be incorporated into the use of the present invention in order to provide additional features and benefits.

According to the present invention, several specialized software applications have been developed to utilize and take advantage of the features/functionalities of the present system of robotic delivery devices. For example, a flexible system of user interfaces is available to monitor and even control the status and movement of one or more tugs through a multi-floor environment. These user interface screens are preferably web-enabled so that they may be accessed from any computer with a web browser.

Additionally, a series of software tools may allow for the remote and local control of one or more robotic devices, including the management of RFID-tagged assets. Specifically, a web-based software tool preferably provides complete control of a robot and its sensors/cameras from a remote computer while the computer shows the robot's progress on an interactive floor plan map of the robot's current environment. Likewise, RFID management software allows for the tracking, logging and maintenance of a plurality of items that are tagged with RFID tags.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 16 is a screen shot of a portal identification page of asset management software;

FIG. 17 is a screen shot of an alert page of asset management software;

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present application is related to U.S. Patent Application No. (not yet assigned) entitled "Robotic Ordering and Delivery Apparatuses, Systems and Methods" which was filed on Oct. 16, 2006 with the same inventors listed thereon. This application deals with similar subject matter and the specification of that application is incorporated by this reference as if set forth in full herein.

The present invention, in at least one preferred embodiment, provides devices, systems and methods to utilize a robotic tug with mated payload carrying cart (or similar robotic device) in order to perform autonomous retrieval/ delivery of goods along a route. The present invention utilizes a mapping algorithm in which the tug attempts to follow a route from the beginning point to the destination. During the delivery trip, a variety of different sensors are utilized to scan for potential obstacles and to constantly determine the position of the robotic device relative to its intended position. This sensor data is then used by a computer onboard the tug and/or the attached cart to alter or modify the preplanned route to avoid obstacles or to adjust the current directional heading to more closely approximate the intended route.

Many different types of robotic tugs, carts and system architectures may be utilized according to the present invention. In the following discussion, the physical features of the robotic tug, the attached cart and the interface between the tug and the cart are initially discussed. Thereafter, a detailed description of certain system components, usage methodologies and other pertinent features and characteristics of the present invention, both required and optional, are presented. Finally, a detailed example of one such robotic tug and attached cart is provided to more clearly illustrate the use of some of these preferred features.

The Tug

Figure 1:
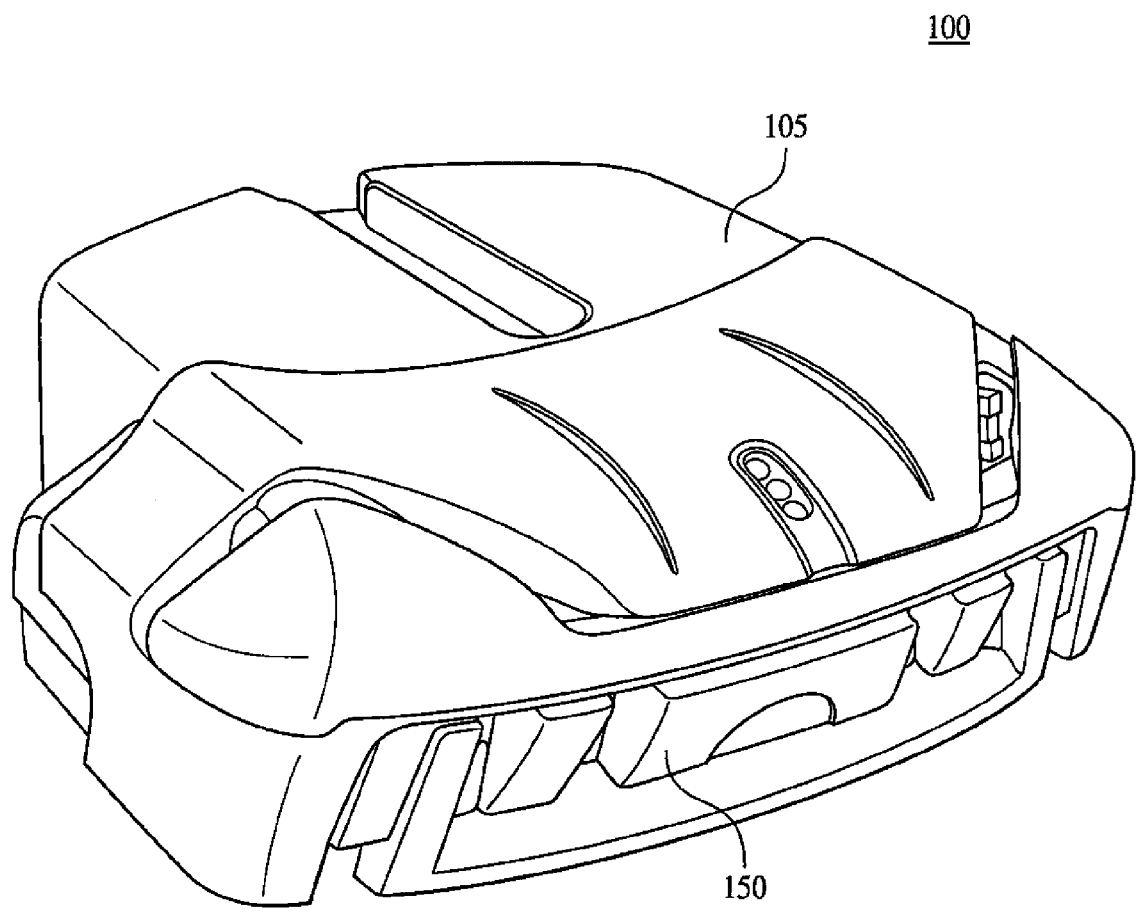
FIG. 1 is an isometric view of an exemplary robotic tug with cover in place.
Figure 2:
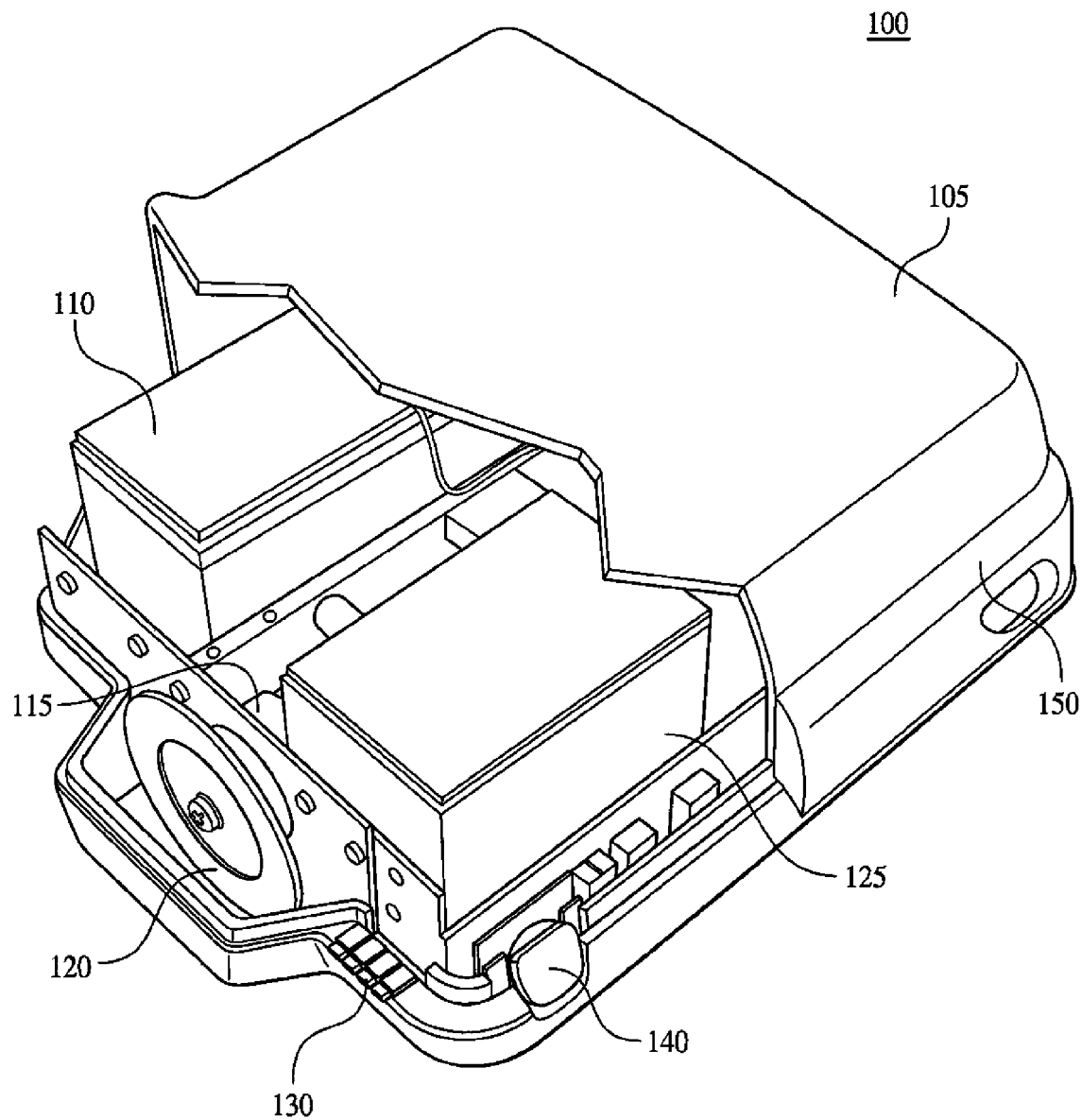
FIG. 2 is an isometric view of an exemplary robotic tug with exposed internal features.
Figure 3:
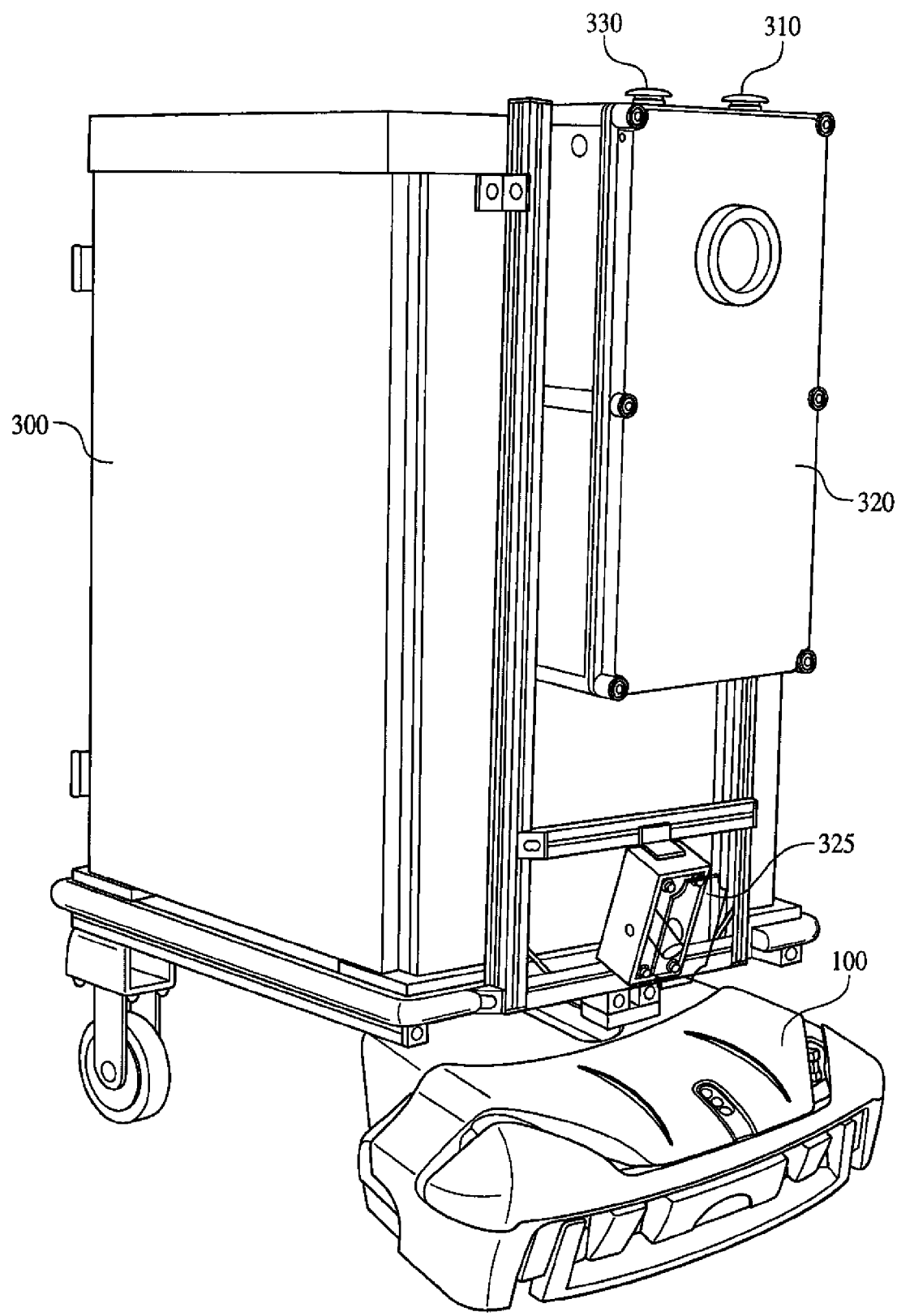
FIG. 3 shows the tug with an attached general purpose cart.

One exemplary embodiment of a robotic tug 100 according to the present invention is shown in FIG. 1 with its cover 105 in place and in FIG. 2 with the cover 105 partially removed to more clearly show internal features of the tug 100. FIG. 3 shows the tug 100 with an attached exemplary cart 300. The pictured exemplary tug 100 is approximately 20" wide and 7¼41 in height. A typical tug includes a very low profile enclosure made of high impact, abrasion resistant ABS plastic 105. Moreover, because the tug 100 will often be used in a hospital setting, the surface of the tug may be smooth for ease of disinfection using conventional hospital disinfectants. The tug preferably is capable of hauling up to 500 lbs. (e.g., loaded by the attached cart 300) and up to 250 lbs. across a typical 1" gap across the entrance to an elevator shaft.

The exemplary tug 100 in FIGS. 1-3 has a 24 volt DC power system provided by sealed, lead acid, maintenance-free rechargeable batteries 110. The batteries may be recharged using a charging station (described below) and preferably runs its twin 24 VDC motors 115 and accompanying electronics for 6 hours on a full charge. Each motor 115 is completely independent of the other motor so that precise steering and wheel 120 position sensing can be controlled on a per-wheel basis. With such a configuration and typical cart loads, the tug will operate at a speed of up to 3' per second, which is fully adjustable based on application. Preferably, based on its mapping software, the tug will automatically dock itself into a charging/docking station when not in use or when the battery is low. A full tug charge process takes no more than 4 hours to complete, with quick charges for shorter runs preferably taking only a matter of minutes.

The tug 100 also contains an onboard computer 125 loaded with the tug operating system (TUG OS) software. This software utilizes a detailed map of the hospital along with sophisticated navigation software to plan robotic device routes, avoid obstacles and constantly track its location through the use of a variety of different sensors and other devices—all as described below.

When used in high traffic environments, such as in a hospital, the tug 100 preferably includes warning tones and lights to signal when it is backing up, starting, stopping and entering/leaving an elevator. A cart-mounted speaker may also broadcast selected messages that explain cart functionality, provide additional warnings/announcements or greet/report a user as various tasks are completed (e.g., when an asset is properly delivered to a final location. For example, the device may include pre-recorded or synthesized messages, or audio may be sent via Voice over IP (VOIP) from a remote host to the tug/cart and played through a speaker. In some embodiments, the tug/cart may include a "push to talk" button which automatically connects the device to a remote host via VoIP. The tug/cart may also include a warning light/sound to indicate an obstruction or tampering with the cart in an unexpected manner.

In order to maintain high accuracy when steering the tug 100, a tug preferably includes two (or four) wheels 120 with an aluminum rim encased in a non-skid, high-traction molded urethane tread. A description of the structure and use of such wheels is set forth in U.S. Pat. No. 7,100,725 which has been incorporated by reference above. Preferably, the wheel core is stiff and cannot compress. The thread is made of polyurethane, the same material used in inline skate wheels.

The tug's movement and stopping ability are closely monitored and regulated through a variety of different sensor configurations. For example, a fully-loaded tug preferably stops before contacting objects detected within 18" of its front bumper by means of a grid of forward and/or side-looking infrared sensors 130 that are constantly scanning the environment of the tug 100. Moreover, the tug 100 and/or cart 300 preferably include a red "stop" button 310 which is readily accessible and may be programmed to automatically stop the cart for 5 to 30 seconds, or some other useful time period, as determined by a particular application.

Generally speaking, the main positioning sensor on board the tug is a series of infrared sensors 130—directional light sensors that measure distance along a single line, the length of which is adjustable. A first set of infrared sensors 130 is pointed outward from each side of the tug 100 approximately perpendicular to the movement of the tug. These positional side sensors 130 are used to continuously measure the distance to nearby walls. Such a measurement can be used along with the onboard maps to determine exactly at what location and position/orientation the tug is currently located. Moreover, by recognizing certain features in the environment, such as walls, corners, pillars, etc., as "checkpoints," the robotic device 100 can constantly monitor its location and movement throughout its environment by comparing the position of the tug to a series of consecutive or continuous checkpoints. This algorithm is described in more detail below.

An additional series of infrared sensors is preferably oriented at various vertical angles in front of and around the sides of the tug 100. During the tug's movement, these infrared sensors, the paths of which form a grid or three dimensional "force field" at least in front of the tug, constantly receive sensor data to detect any obstacles that may be in the way of the tug's intended path. When one or more of these directional sensors determines that the path is blocked, the sensors preferably feed this information back to the tug operating system so that an appropriate evasive action may be taken (i.e., stopping, altering path, turning, etc.).

In certain embodiments, the tug 100 or cart 300 may also include one or more ultrasonic sensors (such as sonar 140) which are oriented generally forward of the robotic device and/or a touch bumper 150. These ultrasonic sensors provide a very high fidelity picture of potential obstructions in front of the device in exchange for a limited distance field of view. Sonar can also help detect objects that are not easily detectable by the infrared sensors (e.g., shiny objects that reflect light or thin, rounded poles). Depending on the specific application involved, there may also be one or more infrared or other sensors that are positioned in specific manner to detect unique obstacles that may be encountered during a delivery in a specific environment. There may also be one or more rear-facing sensors on the cart that provide for obstacle detection.

Since the tug 100 preferably includes constant monitoring from a local computer system, the tug preferably includes radio frequency (RF) communication capabilities (which may also be used as part of an asset tracking scheme, see below). Moreover, additional functionality may be imported to the robotic device if it can wirelessly interact with certain local devices (e.g., automatic door openers or elevator controllers). The radio frequencies used by the tug are specifically selected so as not to interfere with heart monitors or other equipment that may exist in any particular usage environment. The FCC has strict guidelines that govern the selection and use of the RF spectrum. For example, a bio-telemetry device (e.g., heart monitor) currently must operate between 300 kHz and 30 MHz. Therefore an exemplary tug preferably uses a signal for its elevator door relay operations and for its general wireless LAN communications that is designed to avoid other wireless communications that exist in the area in which the tug/cart is to be operated. The wireless communications are flexibly designed to be adaptable to almost any environment with any existing wireless devices.

The Tug/Cart Interface and Exemplary Carts

The interface 315 between the robotic tug 100 and the cart 300 is important because of the disparity between the characteristics of the tug and cart. For example, in most applications, the tug 100 will be of a much lower profile and size when compared to the cart 300, and the cart will be of a much larger weight than the tug. Because of this disparity in size, there must be a strong, yet virtually frictionless connector between the tug 100 and the cart 300. Moreover, this connector 315 must maintain a wide amount of rotational freedom (e.g., more than 360 degrees of freedom rotating around a vertical axis) while providing electrical and communicative connectivity between the electronics and power systems onboard the tug 100 and the cart 300 in order to facilitate the tug maneuvering in tight spaces.

Preferably there are a wide variety of carts 300 that may be used with a single tug 100. Depending on different intended tasks and different types of retrievals/deliveries that may be made, carts with different characteristics, all that may be attached to the tug through the above connector, may be selected. When selecting a cart 300 for a particular application, the tug/cart combination works most efficiently if the smallest cart capable of performing a particular job is utilized. Some common types of carts for use in the hospital industry include: a general purpose cart with a locking door; a tote cart which may be used to stack, store and deliver a variety of different bulk materials; a dietary cart used to transfer a plurality of meals to various patients; and a hamper cart which is used to carry linens or other bulk materials in a low profile carrier.

TUG Operating System (TUG OS) Mapping and Movement

The TUG OS allows multiple tugs to function efficiently with each other. Since the system tracks the movement of all of the tugs, the operating system can automatically avoid tug bottlenecks and facilitate the coordination of elevator use. Moreover, the TUG OS uses onboard maps to plan robotic device routes and control the movement of the tug and cart. Preferably, both the tug and the cart have a computer, and the functions performed by the TUG OS may be split between these two computers (125, 320).

At the heart of the tug's ability to travel around an environment is detailed knowledge of the terrain in which it is operating. In most building environments, this data comes from CAD (computer aided drafting) drawings of the building (see FIG. 7). The CAD drawings are imported into a graphical interface program which is used to create maps which the tug uses to navigate. Since the tug is based on a modified deduced-reckoning system of motivation, the accuracy of the maps translated into the tug's plan for moving from place to place is important.

As part of the preliminary mapping process, the CAD drawings of the building (e.g., a floor of a hospital) are converted by a software program into a format that the tug can comprehend. For example, the CAD drawing may be converted to a bitmap (.bmp) file that is a perfectly scaled representation of the floor plan of the tug's operating environment. The accuracy of the CAD drawings may be checked with manual surveying at key locations. The key is that the electronic file be scaled such that it represents the actual layout of the tug's environment. In this way, the exact x,y position of the robot in the "real" world is directly translatable to any x,y location on the bitmap. Because of this, the robot can always know its precise location.

Thereafter, these electronic maps (bitmaps) are then used to mark the locations at which the tug is allowed to stop (i.e., destinations), the paths that tug will take to move from place to place, the areas in which automatic doors or elevators exist, the location of home base, the location of annunciators and/or any other desired location. For example, software may be used to electronically "insert" destinations and virtual checkpoints, and an operator can actually draw a path between two checkpoints right on the bitmap of the environment. Since this path is selected and drawn by the operator, it can force the robot to move near one side of a particular hallway, move in curved lines to avoid certain structures, and/or follow what would otherwise be less than optimal paths. Each of these locations and paths is represented in the environmental bitmap and is stored into operating system (TUG OS) running on the tug and/or the cart. In this way, the tug has preprogrammed information on the most efficient way in which to move from one point to another, but it also has additional information that may allow it to take a somewhat alternate route should an obstruction appear.

Figure 7:
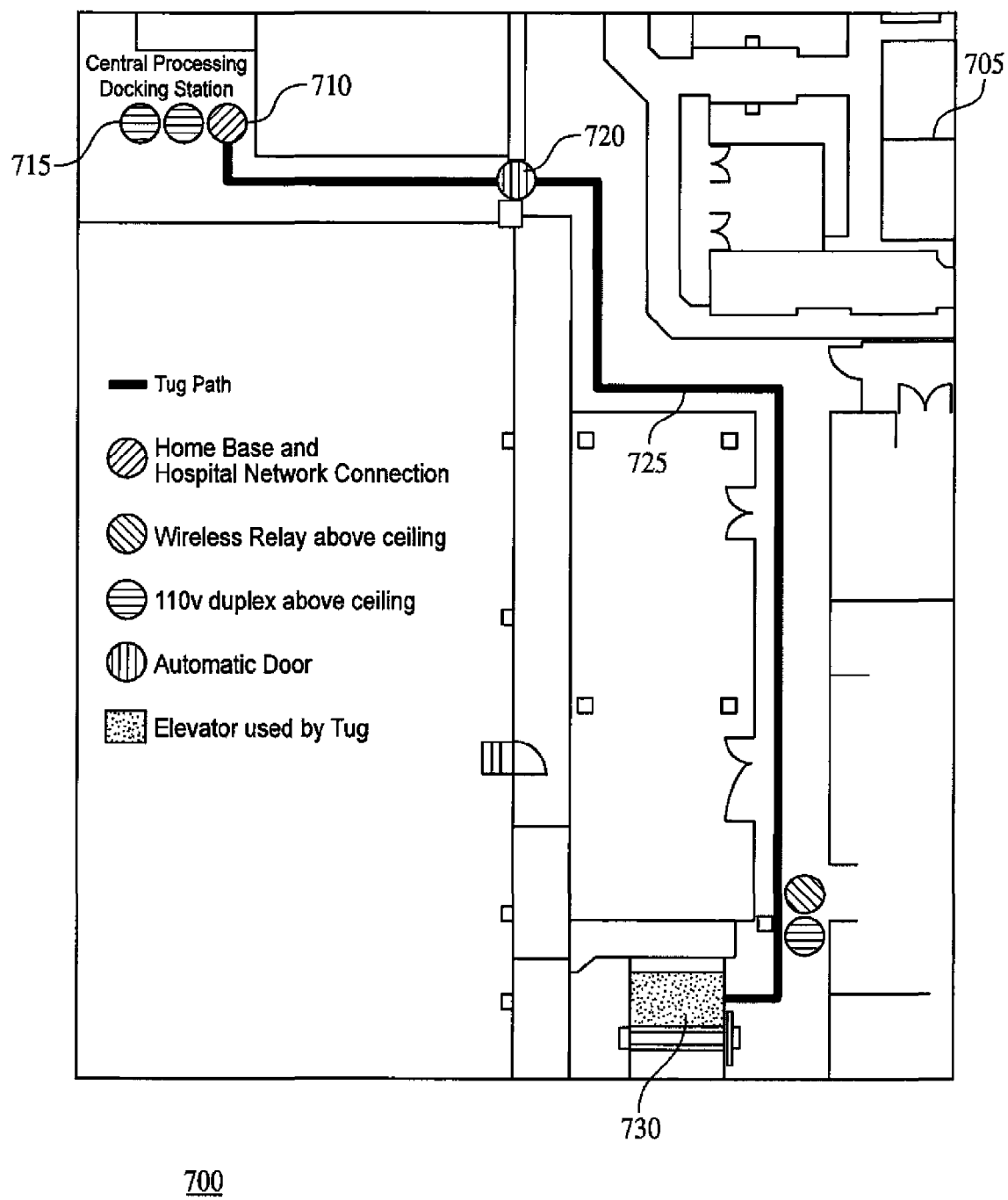
FIG. 7 shows a building CAD floor plan drawing with various system points of interest and a planned tug path depicted thereon.

FIG. 7 shows one example of a bitmap 700 after certain features have been electronically added to the CAD drawing floor plan of an environment. For example, the home base and/or other docking station 710 are shown in the figure. Additionally, the locations of automatic doors 720 and elevators 730 that may be used by the robotic device are depicted overlaid on the existing floor plan (705). Power or communications access points (715) or destination locations may also be shown on the bitmap 700. Finally, the intended paths 725 on which the robotic device will navigate from point to point are also shown. These paths, and all of the associated locations, are shown in the figure at an x,y coordinate that accurately represents its position in real life.

In operation, the robotic device may be directed to make a trip in a variety of ways. For example, a location could be selected directly from the touch screen at the docking station. Alternatively, a nurse or other operator could use a web browser on any computer to send a final destination to a robot. In any case, the final destination is received by the operating system (TUG OS) running on the robot, and this final destination is represented on the stored bitmap. In one preferred embodiment, this TUG OS computer and bitmap are stored in the attached cart. Based on the final destination, the TUG OS software in the cart determines a path to follow in order to arrive at the destination. The TUG OS software then breaks up the path into a series of smaller paths in order to have a list of checkpoints to follow along the path.

The tug's intended path is fed from the cart to the tug in a series of bursts of information that are a list of successive checkpoints or path locations in x,y coordinates. The TUG OS software in the tug compares its current position with the next intended path checkpoint and it determines a velocity to spin each of the wheels in order to direct the tug (and cart) to the next path location. Since each of the two wheels is independently controlled, each of the wheels receives a different velocity command. By adjusting the right wheel motor to a higher speed than the left, a left-hand turn will result, with the amount of the turn related to the speed difference between the two wheels. Encoders on the wheels are used to closely track the rotation of the wheels and the rigid, non-skid wheel surface allows the controller to translate the wheel rotation into the probable position of the tug in relation to the stored map.

As the tug moves through its intended course, it is constantly gathering sensor data from the infrared sensors, sonar and/or any other sensors located on the robotic device. This data may be monitored by the remote host in real time, but it is also used autonomously onboard the robotic tug to determine its current position, orientation and any adjustment to its intended path. The movement along the intended path from the docking station (or other starting position) to any destination is accomplished in the above manner by tracing the paths (in the real world) as they are drawn on the bitmap, while continuously adjusting for path errors and sensed obstacles. Since the onboard map is perfectly scaled to the actual environment, the system is able to compare its real-world x,y position with its intended x,y position on the stored map to constantly update its position with respect to its intended route.

More specifically, when the map conversion is accomplished and the intended routes are matched to the maps loaded within the tug, a series of virtual checkpoints along the route are also mapped. A virtual checkpoint may be any landmark or detectable object/feature within the line of site of any of the sensors onboard the robotic tug or cart. For example, the distance to one or more walls is a one-dimensional way of determining current position (and when combined provides more degrees of positional assurance). Moreover, corners and other wall intersections provide well defined virtual checkpoints along an intended route. As the cart approaches each of the virtual checkpoints, it can then correct its path, e.g., by adjusting the speed of rotation of one of the two independent wheels on the tug) to realign itself with its intended path.

As an alternative, an onboard camera (see 325 in FIG. 3) could be used with a vision system to perform the same obstacle avoidance and position correction tasks as described above with respect to the infrared sensors. The camera may be an additional sensor that is simply used to take pictures of the surrounding area during operation of the robot, or the camera may be used as the primary sensor with which obstacles are detected and/or position is confirmed. Such a camera may be an ordinary visual camera, an infrared camera, a stereovision camera or any other imaging sensor. Typically, both a local user and a remote host can view the video feed from such a camera to gather data about the robotic device's current environment and to address any detected problems.

Multiple wall and corner virtual checkpoints can be used in tandem to provide a high level of accuracy in position and orientation in relation to the stored map of the environment. For example, as the robotic tug traverses down a hallway, it may "plan" to remain 12 inches away from the wall at all times. By continuously monitoring the side sensor distance to the wall, each of these data points can be used as part of a regression analysis to correct the heading until the side sensor reads the correct 12 inch value repeatedly due to a straight heading. Likewise, when corners and other well-defined landmarks are encountered, these virtual checkpoints are used to correct the forward/backward positional error that may have infected the movement algorithm due to the heading correction based upon the wall-based virtual checkpoints.

A checkpoint is any place that the robot can examine its environment and determine its position. It encompasses "real" checkpoints like doorways and corners that are identifiable. It also includes fabricated checkpoints that are made by putting, for example, and angled mark on the ground (like a "v" shape). As the robot approaches the shape, judging from the angle of approach and the offset of the camera, the robotic device could accurately determine both its heading and its position, and then correct for any discrepancy. These could also be as simple as existing colored tiles on the floor of the environment.

It is noted here that as an alternative to a single side sensor repeatedly taking data from each side to determine position with respect to the walls and then using a regression analysis to correct for positional errors, a series of perpendicular side sensors could be simultaneously employed along the side of the tug. If data representing the distance to the wall is simultaneously collected from each of these sensors, the difference in the measured distance between these sensors would be immediately translatable to the orientation of the tug with respect to the wall. Appropriate steering correction could then be implemented until each of the sensors reads the same distance. Moreover, as described above, data from a rotational sensor in the interface between the tug and the cart could also be used to aid in steering and path planning.

In much the same way, the sensors (both forward-looking and side sensors) may be used to avoid obstacles that are within the intended path of the robotic cart. For example, as the cart approaches an impediment, the various forward-looking infrared sensors will register the distance to the object and its approximate size (or the size could be presupposed according to an avoidance algorithm upon detection of any obstacle). As the object gets closer, it will begin to take shape in the forward-looking sonar. The tug operating system software can then calculate a path to steer around the object and then to return back to the intended path of the tug and cart. Additionally, as the tug is passing the object, the side sensors can be used to detect the object and if necessary steer the robotic device in order to avoid the object.

In general, there are three distinct types of obstacle avoidance methodologies that may be undertaken by the robot depending on the application. These different methodologies are classified as: (1) coarse; (2) sophisticated; and (3) "sniffer" modes of operation. Each of these three methodologies is described in more detail below.

The coarse obstacle detection methodology is based on predefined assumptions. Whenever one of the onboard sensors (e.g., infrared, laser, sonar, etc.) detects an obstacle within its field of view, the software onboard the tug/cart assumes a predefined "standard" size obstacle at a distance from the robot as determined by the sensor. The planned path for the tug/cart is then re-drawn to maneuver around that hypothetical "standard" obstacle and rejoin the intended path on the other side of the obstacle. Upon executing this re-routing operation, if the sensor again senses an obstacle along this new route, the software assumes another standard size obstacle in its path and redraws yet another new path to get around this second hypothetical object. This methodology is considered "coarse" because it makes standard assumptions about a detected obstacle and so is inherently inefficient in terms of the path traversed.

A second obstacle detection algorithm is considered sophisticated. This sophisticated algorithm uses the sensor data from the onboard infrared, laser, sonar and other sensors to just barely avoid detected obstacles. Specifically, when an obstacle is detected, the size and shape of the obstacle are determined using the sensor data and the obstacle is compared to the stored bitmap. The TUG OS software then redraws a path around the obstacle that avoids the obstacle by only a minor distance. As the robot drives past the obstacle, the obstacle's size and shape are continuously monitored and corrections to the path are made in order to narrowly avoid the obstacle. This sophisticated methodology is more resource-intensive than the coarse methodology, but it is also more accurate in terms of path planning.

A third obstacle avoidance methodology is called "sniffer" mode. Sniffer mode is typically entered by the robotic device's software system when multiple obstacles are detected at the same time, for example in a crowded room or hallway. In sniffer mode, the size and shape of the obstacles are detected by the sensors, and the robot plans a route between and around the multiple obstacles. The robot then reduces its speed in order to collect more sensor data per unit of time. At this slower speed, the robot's path can be constantly updated based on the acquired sensor data to guide the robot through the multiple obstacles. In this way, the "sniffer" mode is similar to a specialized application of the sophisticated path algorithm.

One additional optional feature on the tug is a speed cap that can be used to limit the forward movement of the robotic device without stopping the device altogether. Since false positive readings are periodically going to occur when using directional light sensors such as infrared sensors (because of stray reflections off of reflective material), the speed cap is engaged upon detection of any potential obstruction. However, as the purported object should be getting closer to the robot but has not been re-detected, either by the infrared sensors or the sonar, the previous data can be ignored and the device will be allowed to ramp up to full speed.

Typically, the path planning (map) software assigns speed limits (represented by different colors in the bitmap) to each segment of the robot's path. The speed cap is a way of overriding the predetermined speed limit when an obstacle is detected. For example, even if the path segment has a speed limit of 3.0 feet/second, the detection of an obstacle at less than 25 feet in front of the robot may place a local speed cap of 2.0 feet/second. Moreover, as the robot moves closer to the obstacle, this speed cap may allow only an even lower top speed. In this way, especially in areas with lots of highly reflective materials, the overall negative effect of false readings will be limited instead of completely stopping the tug upon each (false) detection.

Tug Operation/Home Docking Station

Figure 8:
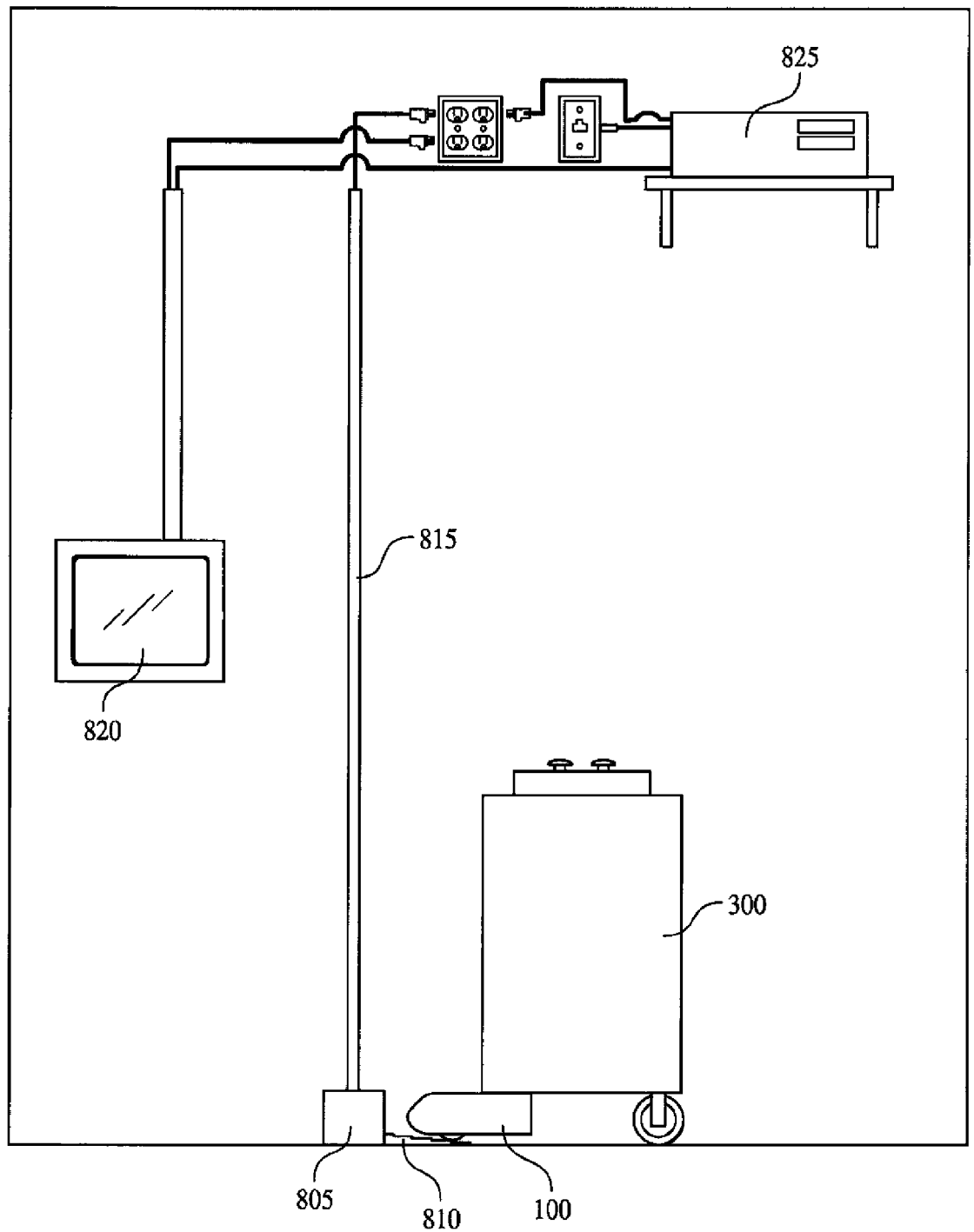
FIG. 8 is a schematic of an exemplary tug home base station.

FIG. 8 includes a schematic of one exemplary home docking station at which the tug/cart docks while recharging and waiting to be sent on a retrieval/delivery run. While recharging, the robotic tug 100 may also perform a self-diagnostic check and send a message locally and/or to the remote host about its current status and usage statistics. For example, the robot could check to make sure all sensors are working, check the calibration of the wheels and correct it (send a new calibration number) if it is not correct, check the disk space on the onboard computers, and/or check the battery voltage. If one or more of these checks failed, the tug could send a notification and "refuse" to go on a run.

The tug 100 may also perform an "environmental" check during which it queries the local computer system (e.g., the hospital system) to ensure that the network is running, the power is functional and the elevators are in good working order. From the docking station, the tug 100 and attached cart 300 may be sent from point to point via a simple "one-touch" send and receive algorithm that is built into the tug operating system. The tug 100 basically rests in a dormant state while connected to a home base docking station. The home base docking station also acts as a communications hub between the hospital computer network and the tug itself (via wireless Ethernet communications).

The home base docking station preferably includes several different devices that work together as the human-tug interaction point. At the lower part of the home base station, there is the tug docking base 805 which provides the physical and electrical connection between the tug/cart and the base station. As seen in FIG. 8, there are preferably conductors 810 onto which the tug 100 rests itself while docking. While in place on the docking base, the batteries within the tug recharge in preparation for future trips. If more than one tug is to be docked near each other in a single mass home base docking area, there is preferably some type of physical barrier between each docking station so that the tug can use its side sensors to properly approach its intended docking base. There may also be a wired communication cable to download certain data from the tug to the home base station that is not otherwise transmitted wirelessly during regular operation. This additional data may be useful for report generation, error checking or just to gather date about the use of the tug.

FIG. 8 also shows a conduit 815 running up the wall from the tug docking base 805 which carries the electrical and/or communication cables to and from the tug 100 while it is docked. The other end of the power conduit is plugged into a traditional 110v outlet to provide power to recharge the batteries.

Above the tug docking base 805, preferably at eye level, there may be a computer monitor 820 with touch screen capabilities or some similar interface for the user to interact and "program" the tug on its journey. The touch screen monitor 820 may provide a variety of different display options or gather various input from the user, but the primary purpose of the touch screen monitor is to provide one touch programming of a delivery route for a tug. When the tug is out on a delivery mission, the touch screen monitor preferably displays the location of the tug on a map of the environment as it travels along its intended route to its destination. In some embodiments, the monitor may also include speakers that announce when a delivery is successfully made by the tug. Additionally, the touch screen may display a status for a tug or display messages sent from the remote host.

In preferred embodiments, the touch screen 820 merely displays web pages that are served from the home base computer 825. The main home base computer/server 825 includes a web server that generates and serves various web pages that represent user screens to all of the user interface touch screens 820 located at each of the tug docking stations. Because the user screens are wed-enabled, the user screens may be viewed and manipulated from a variety of different areas. For example, in addition to directly using the touch screen 820 at a docking station (or the main home base docking station) to select one or more final destinations for the robotic device, a user may also make such selections from any web-enabled computer. In this way, for example, nurses within the hospital may select a tug/cart to make a certain run without having to leave their station. Similarly, a user at a remote host may also send a tug to one or more final destinations and/or watch the progress of the tug on the map during a run.

The robotic device may also have a priority queue or scheduler that lists all of the destinations that have been selected for that particular tug in the order that the tug will progress. As the tug arrives at the first destination (perhaps with a delivery of goods), a simple one-touch button (see 330 in FIG. 3) on the robotic device allows a user at that first location to send the tug on its way towards the next "final" destination in its queue. During the tug's trip, however, any user can utilize a web browser and add additional destinations to the list of destinations in the tug's queue or even reorder and re-prioritize the destinations in the tug's queue. This flexibility allows a wide variety of users to utilize a single tug/cart in an efficient manner.

Moreover, this concept of a queue of ordered destinations could be expanded to the use of a robotic device scheduler. For example, because the interface screens are web-enabled, a scheduling program could be used to designate that a certain tug/cart would make a particular run at a particular time in the future (or at the same time each day or every Tuesday). The flexibility and simplicity of the priority queue allow for an almost unlimited variety of scheduling and schedule priority functions.

On the receiving end, once the tug and cart reach the intended destination (or next destination), an employee removes the delivered item(s) from the attached cart and presses the green palm button 330 in FIG. 3) on the top of the cart. If the tug/cart has a "next" destination in its queue, it will proceed to that destination. If the queue is empty, the tug then uses its software to determine a path back to its docking station for recharging and to await its next retrieval/delivery run.

Looking back at FIG. 8, if the docking station is the main "home base" docking station which serves as a web server and communications hub for all of the robotic devices, then the docking station will also include a home base computer 825 which performs these system functions. The home base computer 825 preferably includes a wireless network card that is connected directly to the hospital's (or other location's) data network and allows the home base computer to wirelessly communicate with one or more tugs during operation. Through the use of the network, each device on the tug and the hospital network is capable of communicating with each other, virtually in real time. This provides a great deal of flexibility if the tug encounters difficulties. The home base computer 825 and the touch screen 820 are both also powered by a conventional 110V network.

As described above, the user interface touch screens at the docking station (or home base station) can be used to select destinations for the robotic device and to send the device on its trip. Also, these screens can be used to provide status updates on the robot, show the robot as it traverses a map of its current location and provide additional details about current and past runs that the robot has undertaken. These screens can all be accessed at the user interface touch screen of the docking station, but because these screens are actually web pages served by the home base computer, they can also be viewed by any web page browser. Specifically, an operator at a local web terminal or a help desk attendant at the remote host can access and view all of this information to gain information about the status of the robotic device(s) and/or to address a problem encountered by the device.

Figures 4, 5:
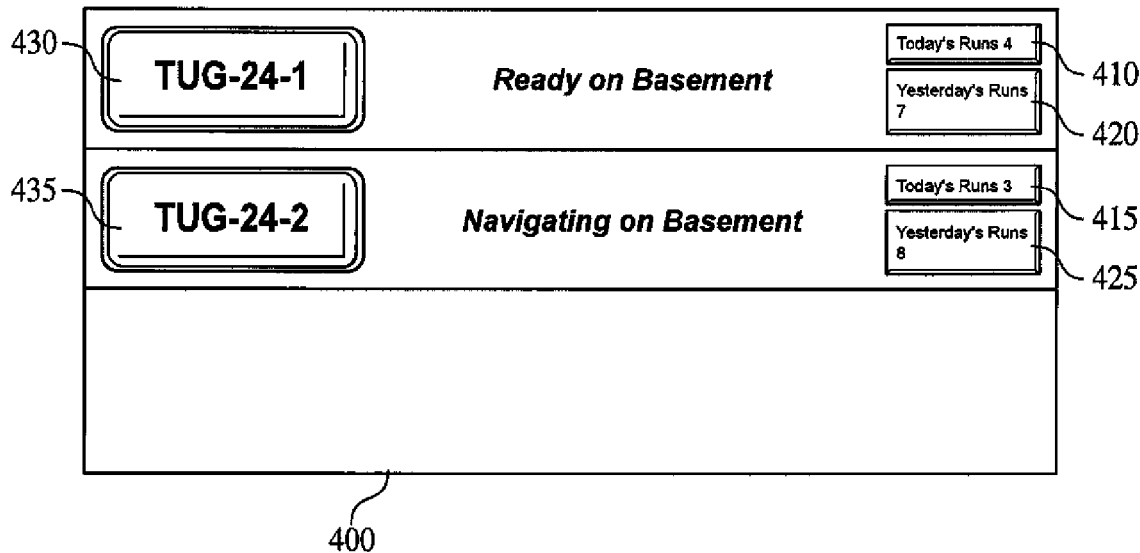
FIG. 4 shows a user interface screen shot of a robotic device status screen.
FIG. 5 shows a user interface screen shot of a robotic device trip summary.

FIG. 4 shows an exemplary status screen 400 that may be displayed at a docking station that serves two different robotic tugs identified as "TUG-24-1" and "TUG-24-2." This status screen 400 includes a variety of information about the tugs. For example, the current status of the tugs is displayed. In this example, TUG-24-1 is "ready" on the basement floor and Tug-24-2 is "navigating" on the basement floor. Generally, if a robotic device is ready for a trip and is fully charged, its status is "ready." If the device is on a docking station charging, then its status is "charging." If the tug is actually out on a run, its status may be "navigating" (in motion) or "waiting" (stopped at a destination or elevator or some other location). Additionally, if the robotic device is charging but does not yet have sufficient charge to make an average length run, the screen may have a counter that informs the user how much more charge time is needed in order to safely complete the next run. Note that the status screen also provides the location of the robotic device at the current time (e.g., basement, $1^{st}$ floor, etc.).

The status screen of FIG. 4 also includes links to the run history for runs made by these two robotic devices on the current day 410, 415 and the previous day 420, 425. These links also include an identification of the number of runs that were completed for each of those time frames. If one of these history buttons is selected (using the touch screen or a mouse pointer in the web browser), a run summary screen is shown. For example, selecting the yesterday's runs button 410 for TUG-24-1 brings up the summary screen 500 shown in FIG. 5. This summary screen 500 provides details about all 7 runs that TUG-24-1 made on the previous day. This detailed information includes an identification of the sender, the start and end times, the total time of the run, the destination(s) that the tug achieved and a calculation of the total trip time (including the tug's return trip to its docking station) and the total wait time. All of this information can be used by the operator or the remote host to judge system efficiency and to address any problems. For example, a longer than normal trip time may be caused by the robotic device encountering an obstacle or getting stuck in a certain location. Reviewing additional data and camera images from this run may help to determine the source of such a problem. Likewise, a long wait time at the final destination may indicate a need to train personnel at that location about the use of the robot or may indicate the need for an annunciator at that location.

Note also that some runs may include a series of multiple destinations. For example, TUG-24-1's second trip of the day went to the Radiology department, then to the ER (Emergency Room) and finally to location 3A. The timing of each segment of this total trip is separately logged.

Figure 6:
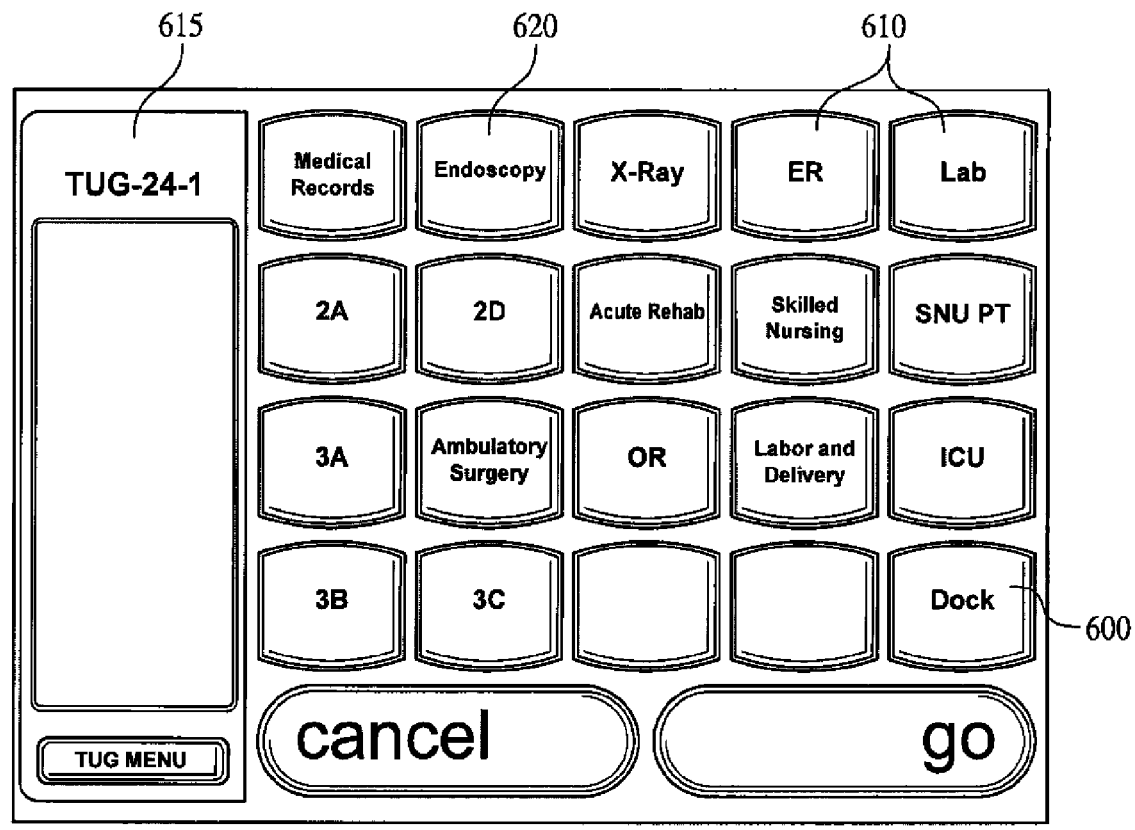
FIG. 6 depicts an exemplary user interface screen for selecting delivery destinations.

Turning back to the status screen 400 of FIG. 4, the screens that control the operation of each tug may be accessed by selecting the button 430, 435 identified with the name of the robotic device. For example, selecting the TUG-24-2 button 435 preferably brings up a menu that allows one or more destinations for that robotic device to be selected with a single push of the touch screen. FIG. 6 shows the destination selection screen 600 for use with selected robotic device.

As seen in FIG. 6, the destination selection screen 600 preferably includes a grid 610 of destination to which the tug may be directed. The screen 600 also includes a list or queue 615 of destinations that have been selected by the operator. As the user selects destinations from the grid 610, the names of these destinations will populate the queue 615 in the order that they are selected. If the operator intends for the robotic device to go to endoscopy, the operator selects "endoscopy" from the grid 610 and then hits the "go" button 625 to send the robotic device on its way. The tug menu (FIG. 4) can also be selected from this screen 600 with the button 630 below the queue 615.

Figure 9:
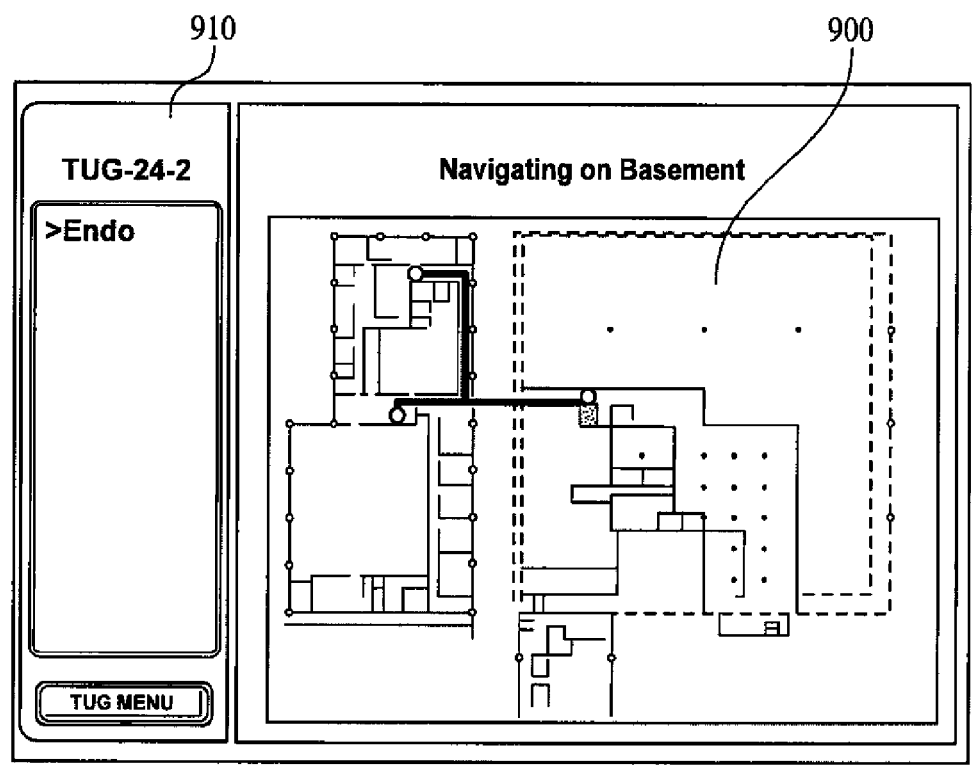
FIG. 9 shows a user interface screen shot of a floor plan map of a robotic device during navigation.

After the operator has sent to robotic device on its way. The user interface screen preferably changes to map mode and a map of the tug's current trip towards its destination is shown on the touch screen (or any web enabled computer screen). FIG. 9 shows an exemplary map screen for TUG-24-2 after it has been sent to endoscopy. Note that the destination queue 910 shows the next destination as "endo." Additionally, the screen shows a map 900 of the tugs current journey towards endoscopy on the basement level of the hospital. The map 900 shows that the tug/cart has left its docking station and moved down the hallway towards an elevator (because endoscopy is on a different floor of the hospital). Preferably, this map 900 is updated in real time as the robotic device travels throughout the hospital. Note to that the status of the robotic device has been updated to "Navigating on Basement" since the tug is on its trip.

At certain points during its journey, the tug/cart may encounter a wait of some sort. For example, while riding an elevator, the tug between floors and is waiting to exit the elevator. At these times, the map screen may be updated to inform the operator (or remote host) of the "waiting" status of the robot. Also, since the tug may be between floors, the map may be replaced with a picture of the elevator or other applicable icon.

Figure 10:
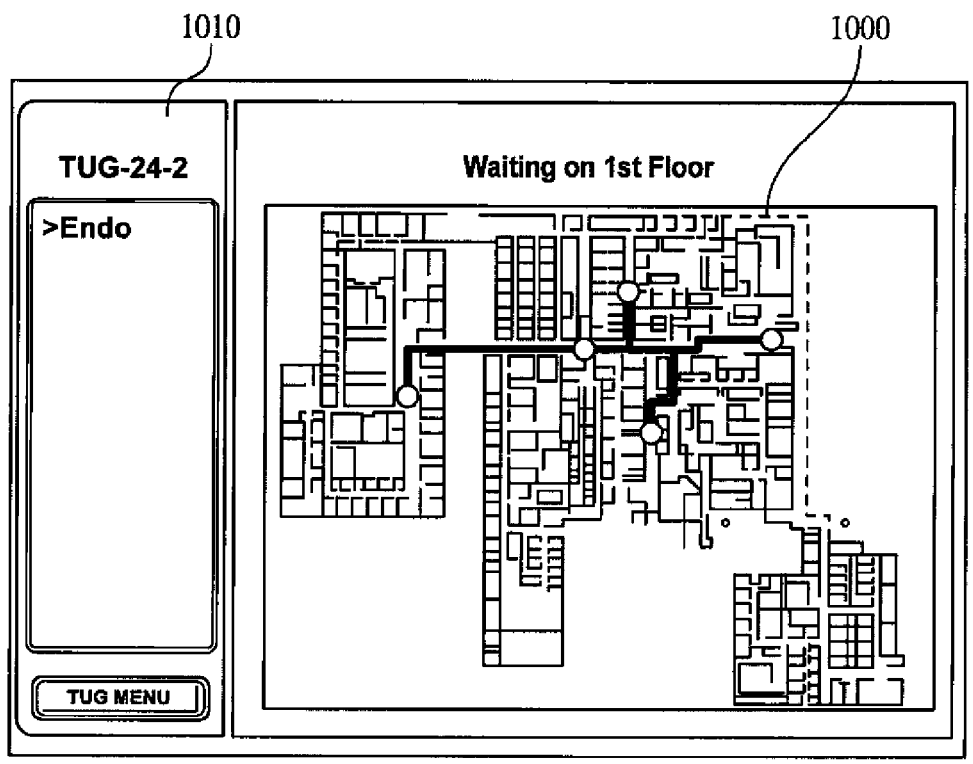
FIG. 10 shows a user interface screen shot of a floor plan map of a robotic device waiting at its destination.

FIG. 10 shows an updated version of the map screen after the robotic device has ridden an elevator up to the first floor, traversed the floor to its destination at endoscopy, and is awaiting a user to address the contents of the cart and send the tug on its way (in this case, back to the docking station). Here, the map 1000 has been updated to show the current location and floor for the tug. Also, the destination queue 1010 has been updated to reflect the fact that the destination has been achieved (the "check" mark in 1010). Moreover, the status of TUG-24-2 has been updated to "Waiting on $1^{st}$ Floor."

If no person addresses the contents of the cart within a certain predefined amount of time (e.g., 10 minutes), the robotic device may move to its next destination (or back to its docking station). Once at its docking station, the device may pop up a user screen that identifies that the delivery was not successfully achieved and that the operator should check the contents of the cart to address the failure of the delivery.

In all, the user interface screens are highly flexible in that a user (or remote host) can access current status and historical information about the robotic device's use while also being able to schedule future trips for the robot. This flexibility, as well the web-based nature of the screens, allows for a wide variety of uses of the present robotic retrieval/delivery system.

Additional Optional System Components

There are several optional system components that may be used to expand the functionality of the robotic retrieval/delivery system. Many of these optional components address certain commonly encountered obstructions that may otherwise be difficult for an unmanned robotic vehicle to negotiate. Things like closed doors, automatic doors and elevators can all be addressed through various optional aspects of the present invention. In these situations, "annunciators," automatic door interfaces, notification systems and elevator control boxes each address one or more of these potential limitations.

When a robot is scheduled to make a delivery to (or retrieve an item from) a location that is behind a closed door (e.g., within a patient's room), an "annunciator" can be mounted on a wall or tabletop within the room. As the tug approaches the room, the tug sends a radio frequency (RF) signal to the annunciator which causes the annunciator to make an audible noise and/or to flash lights on the annunciator to indicate to the user that the tug has arrived outside the room.

Similarly, in many different environments, the use of automatic doors has become commonplace. Automatic doors may prevent certain robotic vehicles from entering certain areas of the environment in which deliveries are desired. The use of an automatic door interface circuit addresses this situation, by allowing a tug to remotely control the existing switch for an automatic door. Therefore, as the tug approaches the automatic door, the tug is able to "push" the automatic door button by closing the circuit via wireless communication with the automatic door relay (again, similar to a garage door opener).

Along with the above-described wireless communications systems, the present system could also incorporate a pager system or other notification system to alert users or administrators that delivery was made or that an error condition has been encountered. For example, if a delivery is repeatedly being made to an area at which a person is often absent, that person could be given a pager which would be called by the tug as it approached the area for delivery. In many embodiments, this notification could take place by the automatic generation and sending of an email or text message (without the use of a conventional paging system). Without visually monitoring the delivery destination, that person could still be available to receive the delivery through the use of the pager.

Similarly, any error condition could also trigger a page to a system administrator, either locally or at the remote host, to follow up with corrective measures. Preferably, pages/notifications to the help desk come into a queue and then different help desk operators can "claim" the page and address the problem. Some example pages may include "blocked hallway" and "elevator malfunction."

Typically, someone at a help desk at the remote host will monitor these incoming notifications (email or text messages) and can direct a solution to the problem. For example, if a tug sends an electronic notification to the help desk that it is "stuck," the help desk can use its web-enabled software to view a map of the environment in which the tug currently resides and can see the location of the tug relative to its intended path and the environment. The help desk operator can view real-time images captured by a camera onboard the tug and can diagnose certain problems based on the captured images. The help desk operator can also take control of the functionality and operation of the tug via remote control from the help desk at the remote host or service center. Additionally, the help desk operator may trigger one or more predefined messages to be played at the tug (i.e., "please call for maintenance") or the help desk operator may initiate a Voice over IP (VoIP) connection and speak remotely through a speaker attached to the tug/cart. Since most communications and control are web-enabled, the system is very flexible.

Finally, the tug is also preferably capable of automatically moving from floor-to-floor in a building using the existing elevator systems of the building. This is an important distinction with prior art autonomous robots that are restrained to conventional two-dimensional movement within a single floor. In preferred embodiments, the tug uses an elevator of a hospital using onboard electronics that allow the tug to "take over" the control of the elevator by communicating directly with the building's elevator systems. The tug can call the elevator and select a destination floor using a wireless signal.

The robot may also accommodate an elevator's fire service mode. Specifically, when an elevator encounters an emergency and enters fire service mode, the robotic device must exit the elevator cabin as quickly as possible. Under these circumstances, the navigation methodology of the present invention preferably includes a routine that detects when an elevator in which the robot is riding enters fire service mode and immediately drives the robot out of the elevator doors on whatever floor the elevator cabin is currently as soon as the sensors detect that a door has been opened. In this way, the tug/cart can free up the elevator for use by the fire fighters.

Wireless Tug Communication

The tug requires wireless network access for tug communications at the home base computer, the elevators and elevator lobbies, and areas where multiple tugs may cross each other's paths. To facilitate additional features and communications, it is preferred that wireless computer access be provided throughout the full range of the tug's intended paths. Also to facilitate communication, a static IP address is assigned to each tug, home base computer and elevator computer.

Remote access to the tug home base computer is accomplished with a Virtual Private Network (VPN) tunnel which provides an encrypted and secure way of transmitting data between the hospital and a remote host (i.e., Aethon) via the Internet. This is one reason for providing a static IP address for the home base computer. The remote host may include email communications with the building provider (e.g., the hospital) and it may facilitate an electronic help desk which both monitors the status and movement of all of the tugs and answers user questions related to the operation of the tugs. Data may also be collected at the remote host. For example, the system may send an email message confirming each delivery that is made by each tug. Such data is useful for reporting and trouble-shooting.

Figure 12:
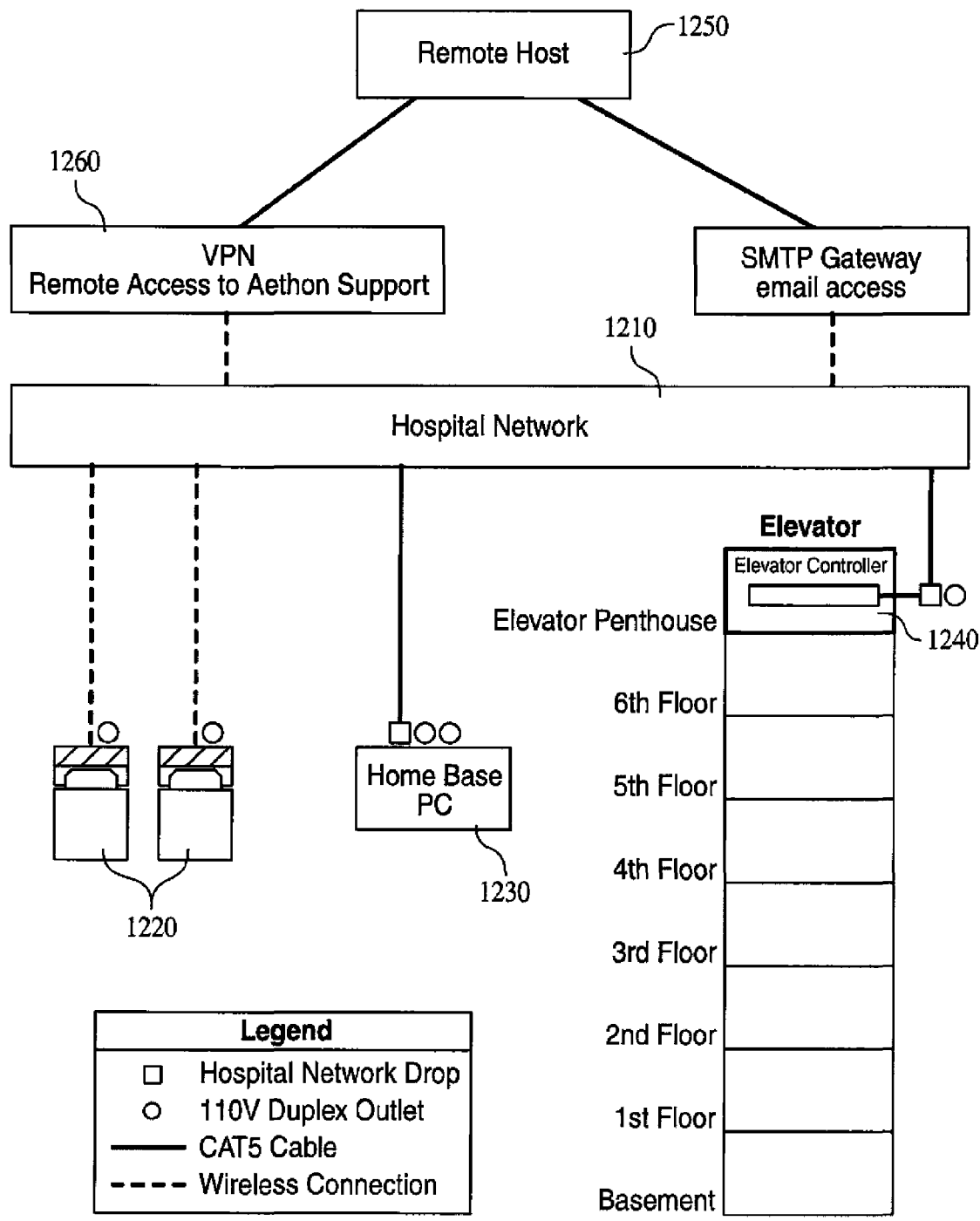
FIG. 12 is a schematic of an exemplary network architecture use with the present invention including a primary data network, a remote host center, and a wireless network utilized by the tug.

FIG. 12 shows one exemplary embodiment of a network diagram for use with the present invention. The main communication point in the center of the network is the existing hospital (or other location) computer network 1210. This is typically a wired or wireless Ethernet network but it may take on a variety of different forms within the scope of the present invention.

Within the same location, below the hospital network 1210 there is shown the system components that exist on site. In FIG. 12, two separate docking bases 1220 for tugs are shown connected to the network along with a home base computer 1230. As described above, these devices are preferably coupled together at one location as part of a home base station which acts as a recharging stand, wireless communications hub and starting point for deliveries. FIG. 12 also shows an elevator controller 1240 which is attached to the hospital network 1210 on one side (for communication with the tug) and the elevator control panel on the other side (to electronically control the elevator when requested by the tug).

Above the hospital network 1210 and connected wirelessly thereto, the system components related to the remote host 1250 are shown. FIG. 12 shows the VPN connection 1260 that preferably takes place over the Internet as well as an SMTP gateway email access for automatic emailing of certain data from the tugs to the remote host 1250 upon certain occurrences (e.g., delivery completion).

The robots are capable of storing data about trips to aid in the future planning and use of the system of the present invention. For example, the robots preferably log the time at the start of the run, when the tug arrives at certain locations, when it arrives at its final destination, and when the tug is sent on to its next destination. This lets the system record how long it took for some one to hit the "go" button. The system also tracks how long the return trip to the docking station takes. Other data (sensor distances, camera snap shots, etc.) may be logged on the robotic device and only uploaded once a day (or not at all) depending on the use. The system is flexible in that it can record and store data locally, with the home base computer, and with the remote host in an almost unlimited number of configurations.

Mapping, Monitoring and Navigation

At the heart of the ability of the robotic device to be able to accurately determine its position within its environment and to navigate through that environment is an accurate map of the environment that is stored in the robotic device. Specifically, the map is a precisely scaled representation of the floor plan of the building or other environment in which the robot operates. On this electron floor plan, operators predefine different paths, destinations and intermediary checkpoints that are used by the robotic device to determine the path it will follow.

The mapping process begins with one or more CAD or other drawings that accurately depict the floor plan of the environment. The users of the software scan in the CAD drawings and darken in all of the places that the robot can not travel (i.e., walls and non-floor spaces). The darkened areas are later determined by the robot not to be traversable and the lighter areas are potential areas in which the robot can travel. Since the CAD drawing is perfectly scaled to the actual building, this scanned representation of the CAD drawing (often stored as a bitmap or .BMP file) is also a perfectly scaled rendering of the floor plan. Optionally, certain key measurements can also be taken on site (e.g., a measurement between two corners or a doorway and a corner) to confirm and correct the accuracy of the generated bitmap.

After generating this scaled version of the floor plan of the environment, the operators can "draw" onto the bit map places that the tug may make a retrieval or deliver (e.g., final destinations), places where the tug may want to stop in order to, for example, allow another robotic tug to pass (e.g., "hot points"), and the actual path segments that the robotic tug is supposed to follow when traveling from one point to the next. For example, in a certain hallway, the user may always want the robotic tug to travel within 12 inches of a wall on a certain side of the hallway. In this case, the operators will simply draw a path at this location on the bitmap. Since these drawn paths represent the paths that the robot will take while making a trip, the robots future delivery paths can be predefined (but for obstacle avoidance).

There are several key benefits to the use of an accurate bitmap representation of the robots environment that are not achieved by the prior art. First of all, because the bitmap is an exact scaled representation of the actual environment, a simple x,y coordinate system can be superimposed on the bitmap to identify the position of the robot (or defined features/destinations) within the environment. As paths are drawn, each pixel that is drawn or identified on the bitmap may be directly correlated to a real-world position of the same feature within the environment. Hence, when identifying final destinations or paths to the robot during a trip, the system need only send x,y coordinates that the robot can then lookup on its onboard map to locate the appropriate paths on which to travel. Likewise, the robotic device can constantly monitor and update its position relative to the intended path utilizing this same, convenient x,y coordinate system.

The use of "drawn" paths is also preferred because of its flexibility. For example, the path planners may draw a smooth curve for the robot to follow around corners and hallway intersections. Likewise, crowded hallways or areas that are difficult to navigate can be avoided entirely. Depending on the requirements of the environment, the robots path can be flexibly designed to be minimally invasive to human users of the same environment. Also, the operators can assign speed limits to each of the various path segments. For safety or other reasons, the operators may wish to limit the speed of the robotic vehicle at certain locations, even if the system itself could move much faster.

In order to utilize the robotic device and send it on a trip to retrieve or delivery an item or items, one need only provide a final destination location to the robotic device. For example, if the robotic device is resting on its docking station, a user may select "kitchen" from a list of potential final destinations for that particular robotic tug. That final destination is translated into a final x,y coordinate to which the tug must travel. The Tug Operating System (TUG OS) software compares its current x,y position to the position of its final (or next) destination and then reviews the stored bitmap of the environment (described above). The robot examines the path segments that have been drawn that can lead the robot from its current position to the appropriate final destination. Since the drawn path segments are comprised of pixels that each have a unique x,y coordinate that can be directly translated to a real world position within the robot's environment, the robot operating system generates a list of consecutive x,y positions that it intends for the robotic device to follow in order to achieve its final destination.

In the preferred embodiment, an additional piece of software translates each of these incoming x,y coordinates into an actual position and velocity with which to spin each of the one or more wheels of the device in order to move from the current x,y position to the next x,y position. If the robotic device consists of a tug and an attached cart, all of the maps and main operating system software may reside on a computer within the cart which feeds a list of x,y coordinates to the attached tug. The tug then includes the software which can translate the movement from the current x,y position to the next x,y position into real-world wheel velocities (keeping within the stated maximum speeds for each defined path segment.

Since all of the tug/carts have wireless communications capabilities, the remote host is also able to upgrade the software on the robotic devices from a distance. For example, TUG OS software updates, new floor plan maps and/or any other software/file can be added or replaced remotely.

Through the wireless connections and VPN, an operator at the remote help desk (or other location) can use software to monitor and take control of any of the robotic devices in order to address problems or for some other reason. The remote mapping and monitoring software preferably includes all of the map data that resides within the robots, and it also receives real-time data from the operation of the robot itself. Together, this data can be combined to monitor and control a robot in operation.

Figure 11:
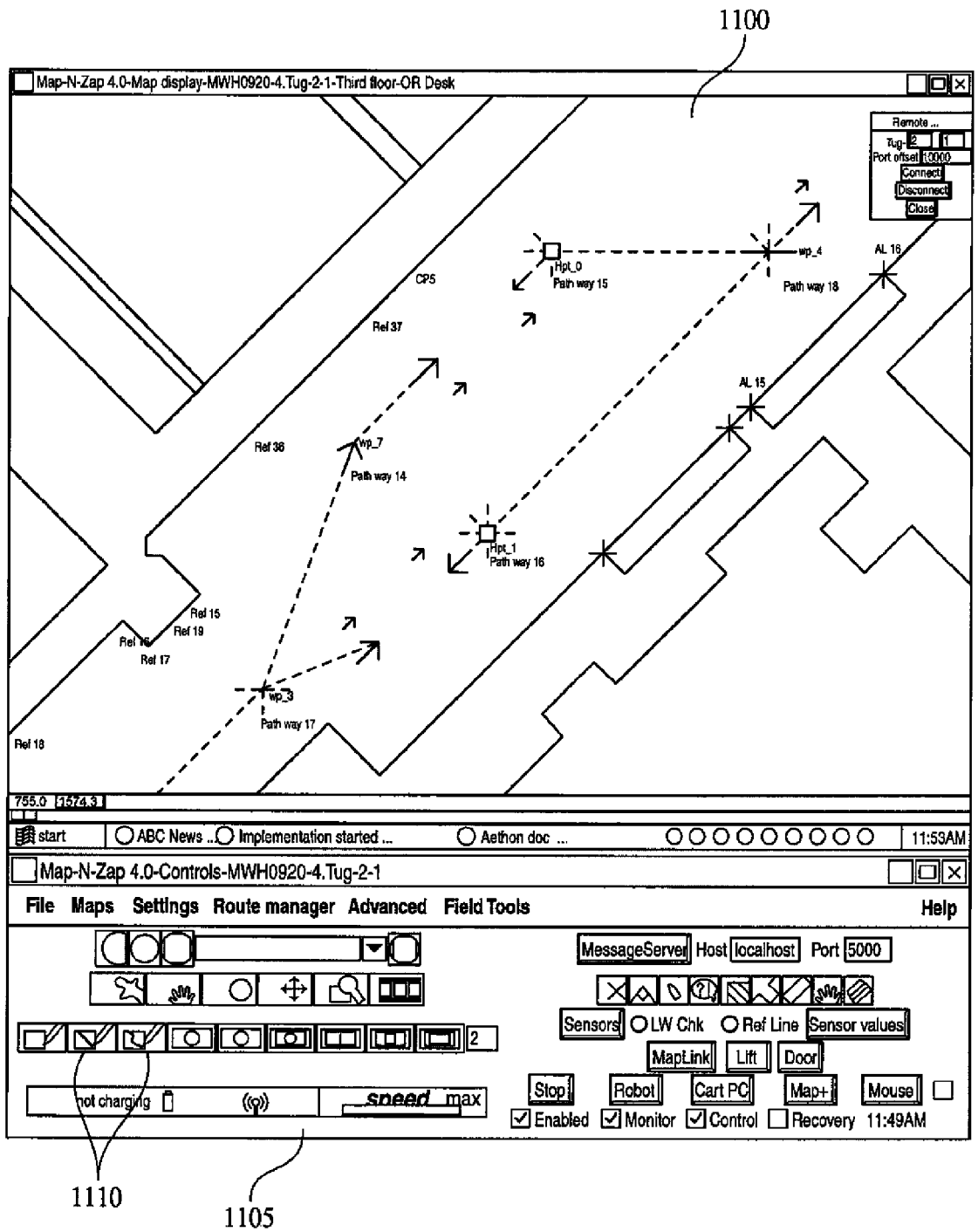
FIG. 11 is a screen shot of the mapping and control software.

FIG. 11 shows an exemplary robotic device bitmap along with software controls to both build/edit the map as well as to control various aspects of the robot during its run. As seen in FIG. 11 (and as described above) the base image of the bitmap (1100) is a scanned and sized image of the floor plan of the environment in which the robot operates. Onto this scanned image, a map designer utilizes common computer based controls 1105 to draw certain relevant features on the map. For example, various paths on which the robotic device may travel can be drawn in using conventional "line" and freeform "pencil" tools 1110 that are known to computer draftspersons. These lines may be assigned various attributes, such as a local speed limit for that path segment which may be represented in the map as different colors for different speeds. Various types of location markers such as destinations, virtual checkpoints, hotpoints and the like can be drawn onto the map using this same software. Likewise, features such as annunciators, automatic doors and elevator controls may also be added.

The key to this map is that it is an accurate representation of the "real world" in which the robot travels. The pixels of the drawing represent standard size real world measurements, and the placement of paths and features will be precisely followed by the robot during its deliveries.

As shown in FIG. 11, the controls may also include different user controls related to robot operation. For example, there may be buttons associated with determining sensor values (the data being streamed to the user), viewing from an onboard camera, managing the messaging queue or other features. A wide variety of controls may be included.

Figure 17:
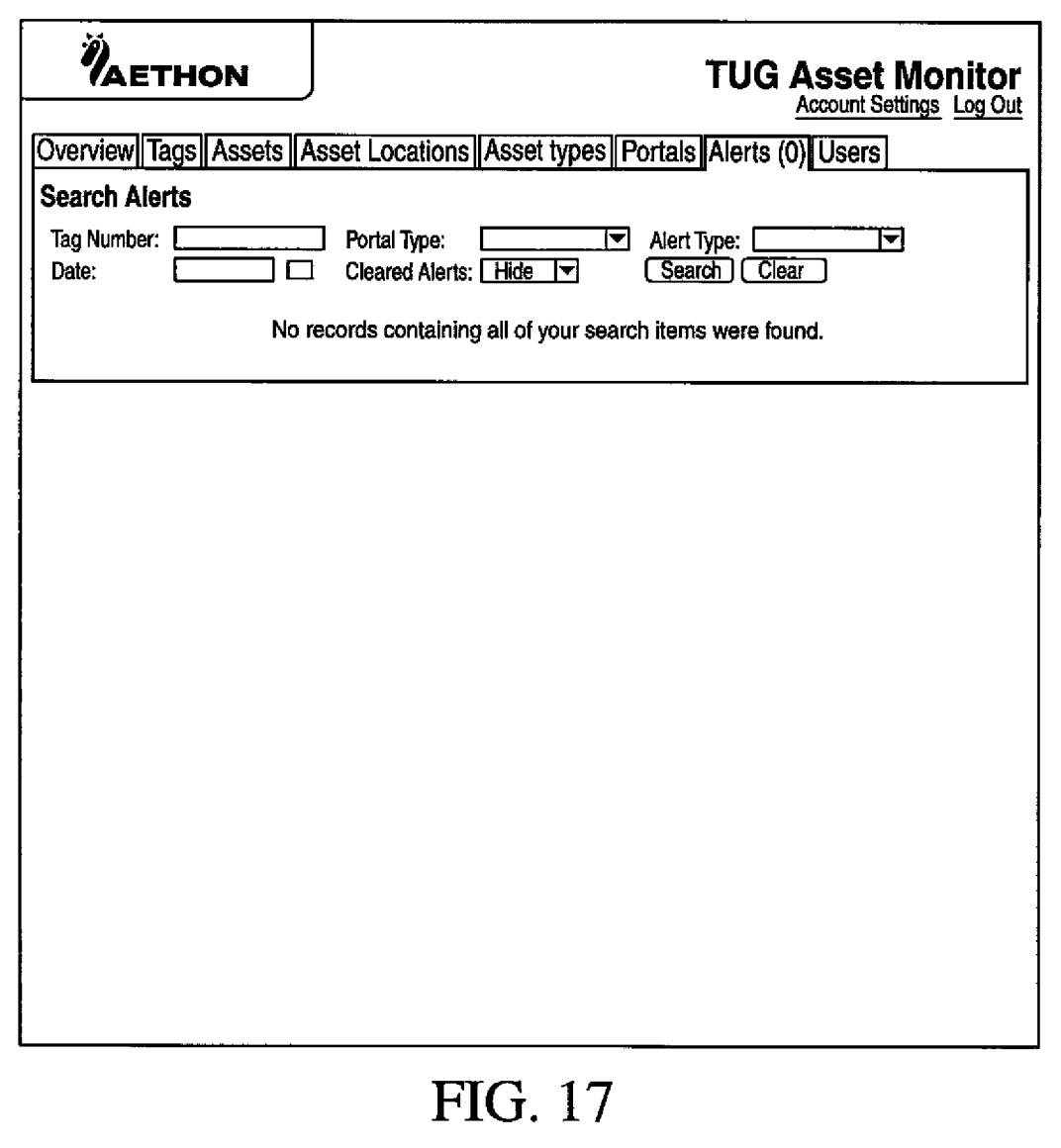
Figure 18:
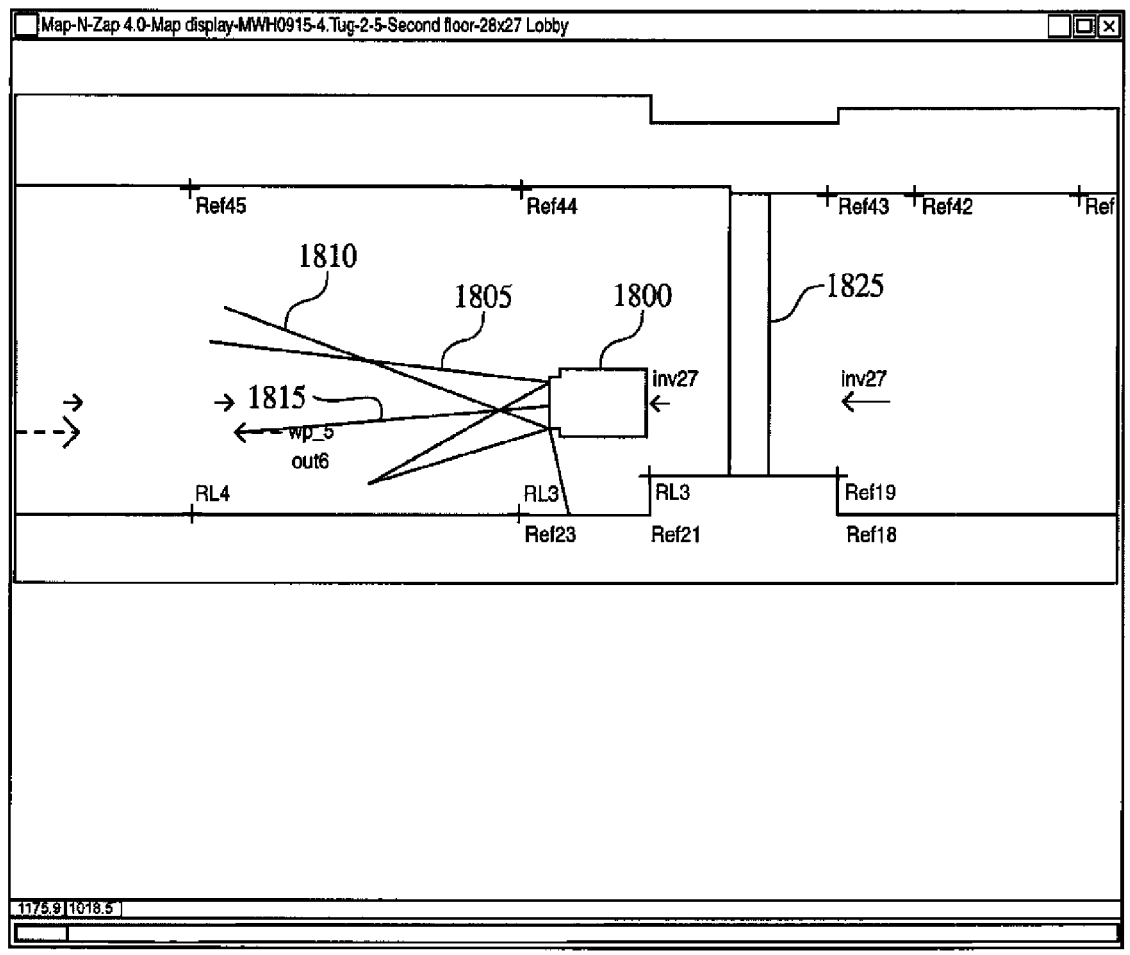
FIG. 18 is a screen shot of the mapping and control software with a tug shown.

FIG. 18 depicts the mapping display software of the present invention when a tug is in motion and navigating along a path. As seen in FIG. 18, the tug 1800 is depicted as a box, and its primary sensors (directional light sensors) are shown as crisscrossed lines 1805, 1810 extending out of the tug 1800. There is also a heading line 1815 that extends out of the center of the front of the tug 1800 and represents the heading of the tug in motion (to the left in FIG. 18). Note that, as with FIG. 17 and its accompanying description, the user can see all of the checkpoints, paths and other map features as the robotic device traverses its environment. Note to that the heading is generally directed along the line of the next path segment (the goal of navigation). In this example, the tug 1800 has just traveled through an automatic door 1825 which is now closed.

Figure 19:
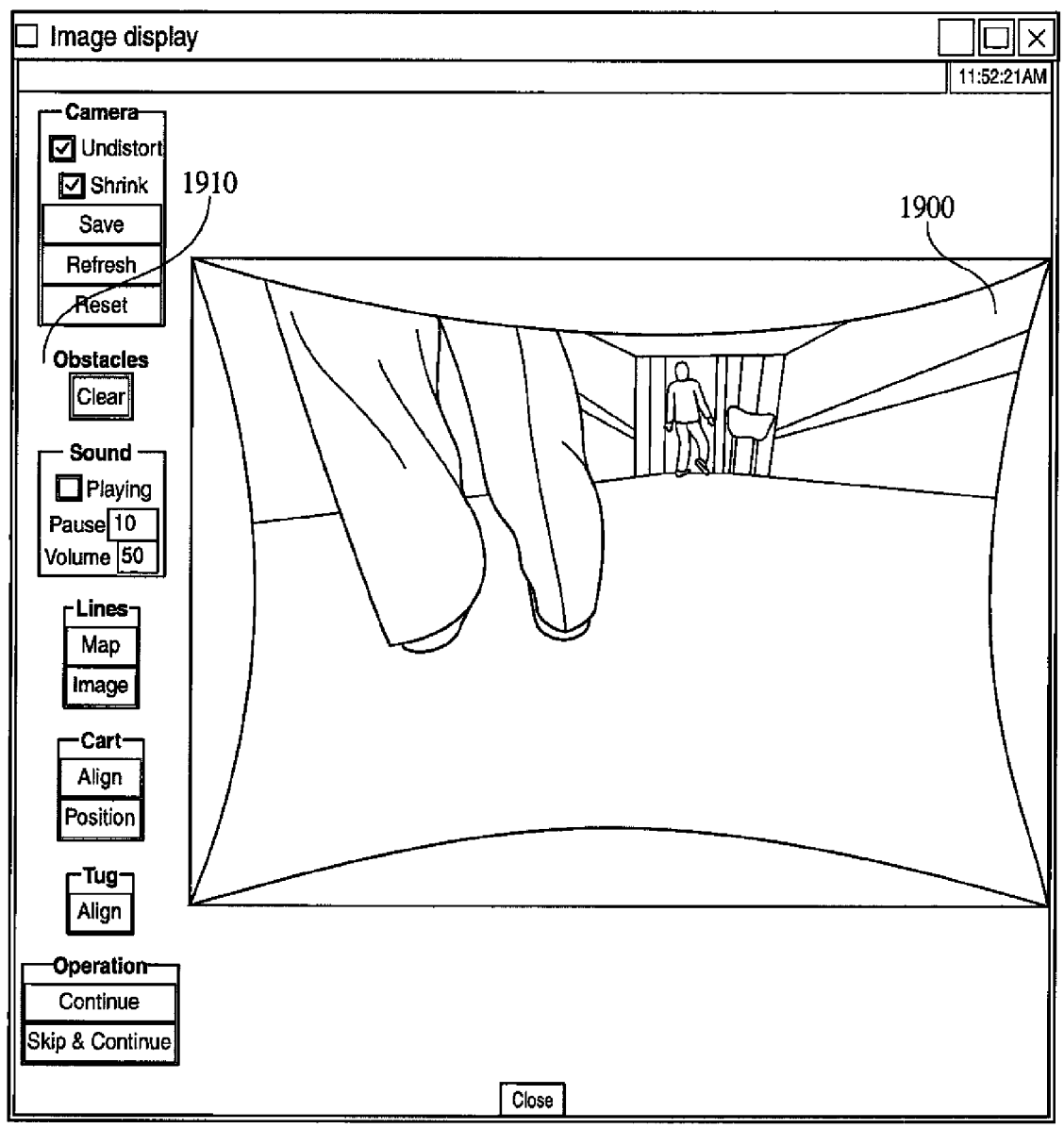
FIG. 19 shows software to remotely view the feed from an onboard camera.

FIG. 19 depicts yet another piece of software that may be used remotely to track the progress of the robotic delivery device. As described above, the device preferably includes a camera that periodically captures images (e.g., when an obstruction is encountered). This image data may be sent to a remote user through the home base station and viewed by the image display program shown in FIG. 19. In the present example, this image was captured because a person walked in front of the robot and tripped its sensor(s).

This image display includes a plurality of camera and image control functions 1910 as well as a main camera view 1900. Exemplary control functions include image de-warping functions, zoom, microphone controls (for an onboard microphone) and predefined image orientations that may be selected electronically. Preferably, the user can also take control of the camera and remotely direct its lens and determine whether it requires still images or a video feed.

Figure 20:
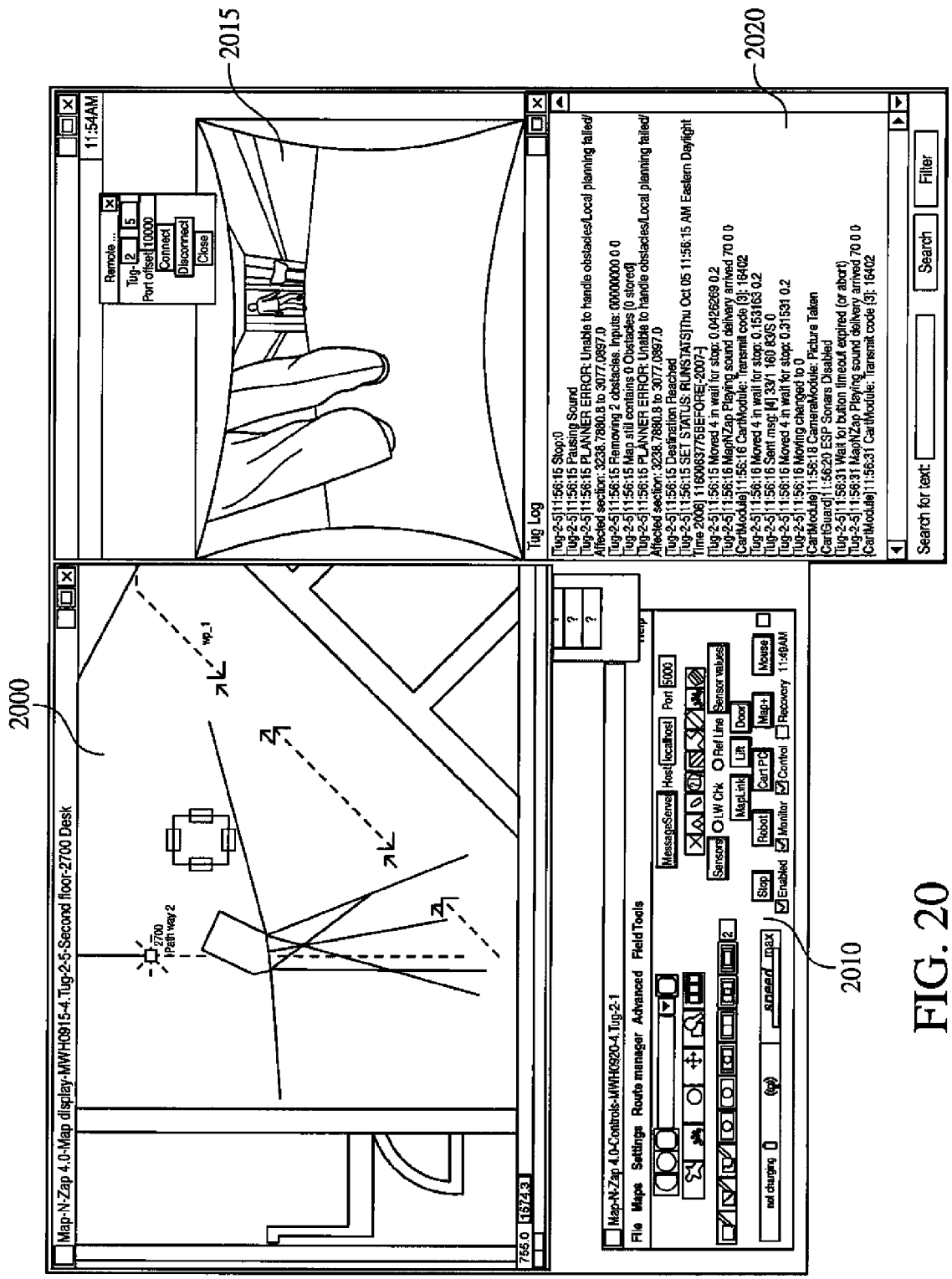
FIG. 20 is a screen shot of the desktop of a system administrator that is using several of the previous software tools to monitor and operate a robotic retrieval/delivery device.

FIG. 20 brings all of the above concepts together in a computer desktop, for example used by a help desk attendant at the remote host. In FIG. 20, a map display 2000 is shown alongside the map controls 2010 previously described. In this example, a tug is shown in motion. To the right of the map window 2000, the camera window 2015 depicts the front camera view of this same robot. Additionally, a screen that shows the text of a tug log 2020 (sensor captures, events, messages and other information received from the robot) for this same robot during its run. This tug log information can also be used to diagnose problems and/or confirm correction operation of the robotic device.

Asset Tracking

The tracking of mobile assets with the use of Radio Frequency Identification (RFID) tags is generally facilitated through the use of the present invention. Traditionally, asset tracking is accomplished through the use of fixed antennas that cover the entire environment in which the tags are utilized. According to the present invention, an antenna could be placed directly on the mobile robotic device so that antenna coverage follows the delivery and pickup of materials on the tug itself.

In use, each asset to be tracked is affixed with a passive or active RFID tag. Passive tags are not powered and therefore have a limited range. Active tags are powered and are therefore more expensive but have many times the range of passive tags. For most environments, active tags are the most appropriate choice. All assets that are to be tracked are fitted with a tag, and the tag identifier and its corresponding real world item are logged into an asset management database that may exist onboard the robotic device, at the primary location, at the remote host or in any other location.

Either a normal tug/cart described above or a specially-design tug preferably roams through the hospital or other local environment searching for tags. In preferred embodiments, a smaller version of the tug is used for asset tracking so that the tug can reach areas that the larger-sized tug and cart could not. As the antenna moves through the environment, it receives an RSSI (Receive Signal Strength Indicator) associated with each detected RFID tag. The robotic device records the locations (x,y coordinates) and RSSI strengths for each RFID tag as they are located. We can also assign a coarse "level" of the RSSI signal (low, medium, or high) to use as a general estimate of how close/far the tagged item is from the location of the tug/cart. However, because of obstacles/walls, antenna orientation, RFID tag transmit strength and a number of other factors, one generally cannot pinpoint the location of an RFID tag, even with a mobile antenna. Based on the recorded signal strength data, an approximation of the location of the item identified by the detected RFID tag can be made. This information may be sent wirelessly to the tug base station and then onto the asset management database.

To complete the asset management system, it is preferred that all entrances/exits to the environment (building) be fitted with fixed RFID antennas to determine when a tagged asset has left the building or area. With this information, the tag database can be updated to include currently accurate information. Also, such a detector could be coupled to an alarm or recorded message that alerts a nearby guard or other attendant that a tagged asset is about the leave the hospital. The asset tracking and exit guarding should reduce theft of tagged items.

The use of the present invention preferably also includes software that allows a local or remote user to manage the RFID-tagged assets that are identified by the robotic tug with RFID antenna. Specifically, the data that is gathered by the antenna about the identity and signal strength of a located RFID tagged could be used to automatically populate an asset management database onboard the robotic device, at the home base computer, or even on a separate asset management database at the remote host or third party site.

Figure 13:
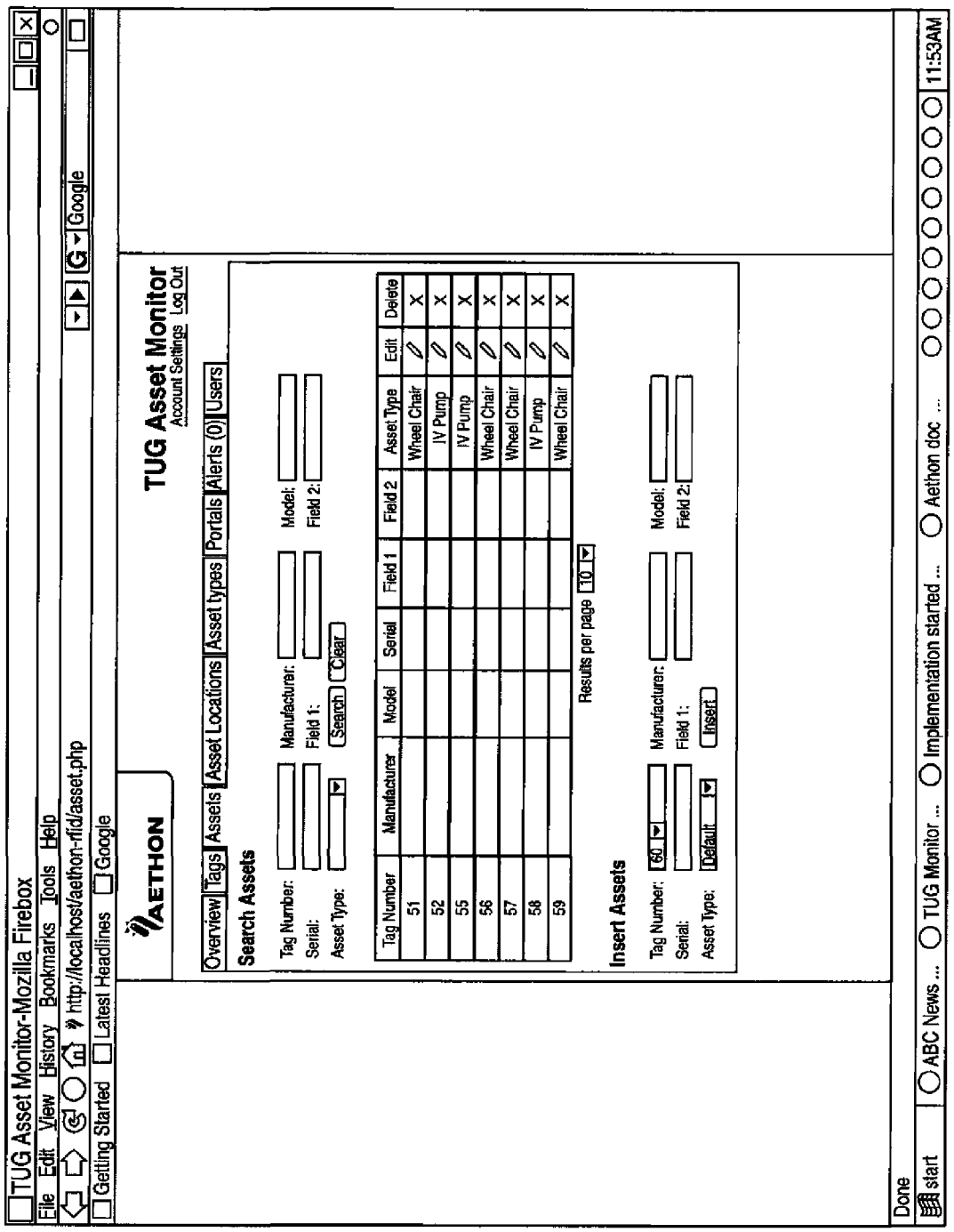
FIG. 13 is a screen shot of an asset identification page of asset management software.

FIG. 13 shows a screen shot of database software that manages RFID-tagged assets. The FIG. 13 screen shows the general structure of a data entry form that allows the user to enter an RFID tag number along with various attributes of an asset that are associated with that RFID number. For example, the asset type (e.g., wheelchair, IV pump, etc.), manufacturer, serial number, model number or other fields can be entered into the database. Existing database fields can be edited using the "edit" button in FIG. 13, and the lower portion of the screen allows for the entry of new RFID tags and assets. Moreover, a search functionality locate one or more stored assets may also be included in the screen.

Figure 14:
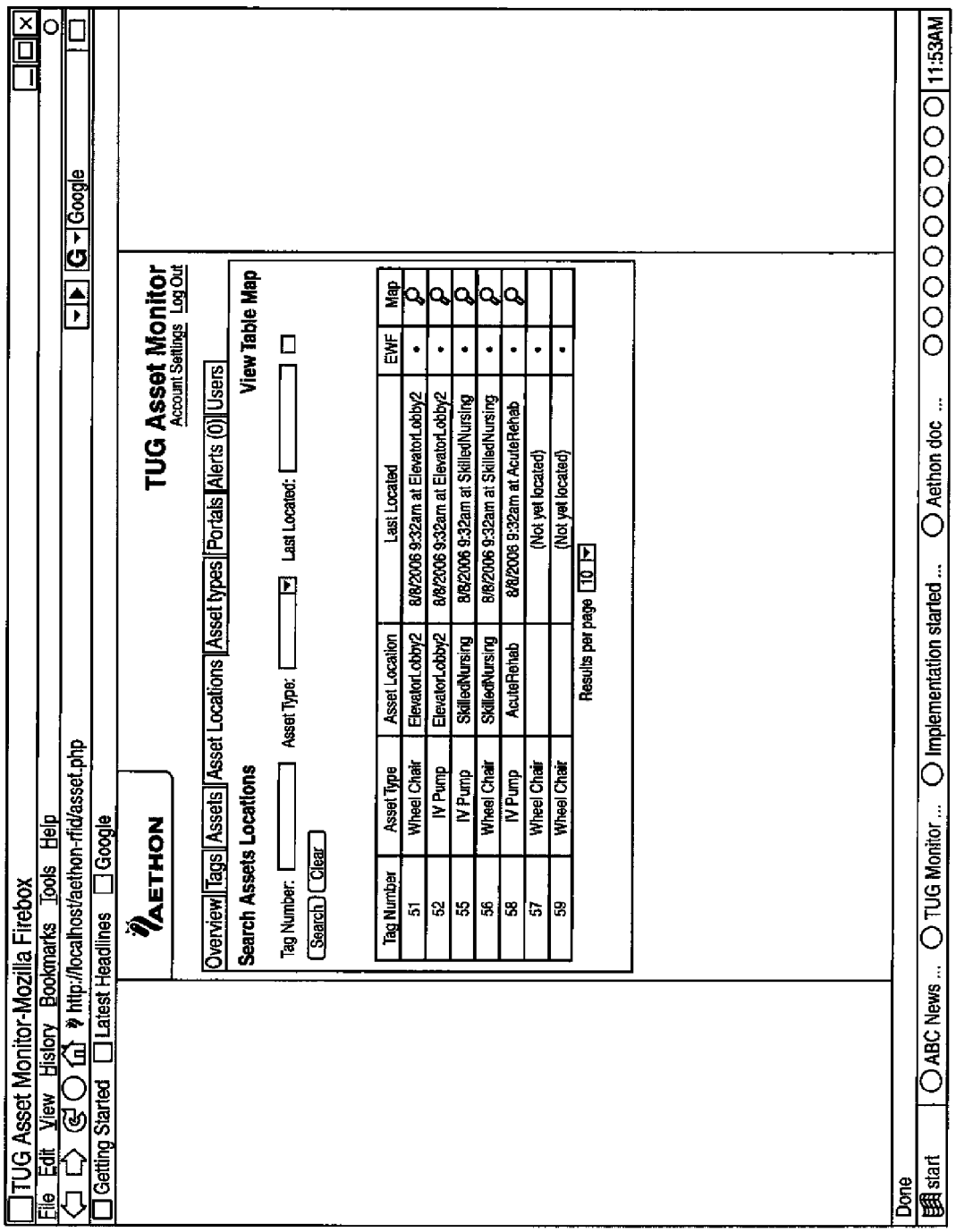
FIG. 14 is a screen shot of an asset location page of asset management software.

By selecting one of the "tabs" at the top of the asset management page, the user can query the database to determine information about the "asset locations." As shown in FIG. 14, the asset locations page may include, for each identified asset, a description of the time, date and location of the last position of the robotic device when each particular asset was last located, as well as a field that lists the assets probable location. This page may also include a "confidence" score assigned to the location of each asset. This confidence score is derived from an analysis of the strength of the RSSI signal at the time of last detection, how long ago the item was last detected, the number of times that the asset has been detected and other factors.

Figure 15:
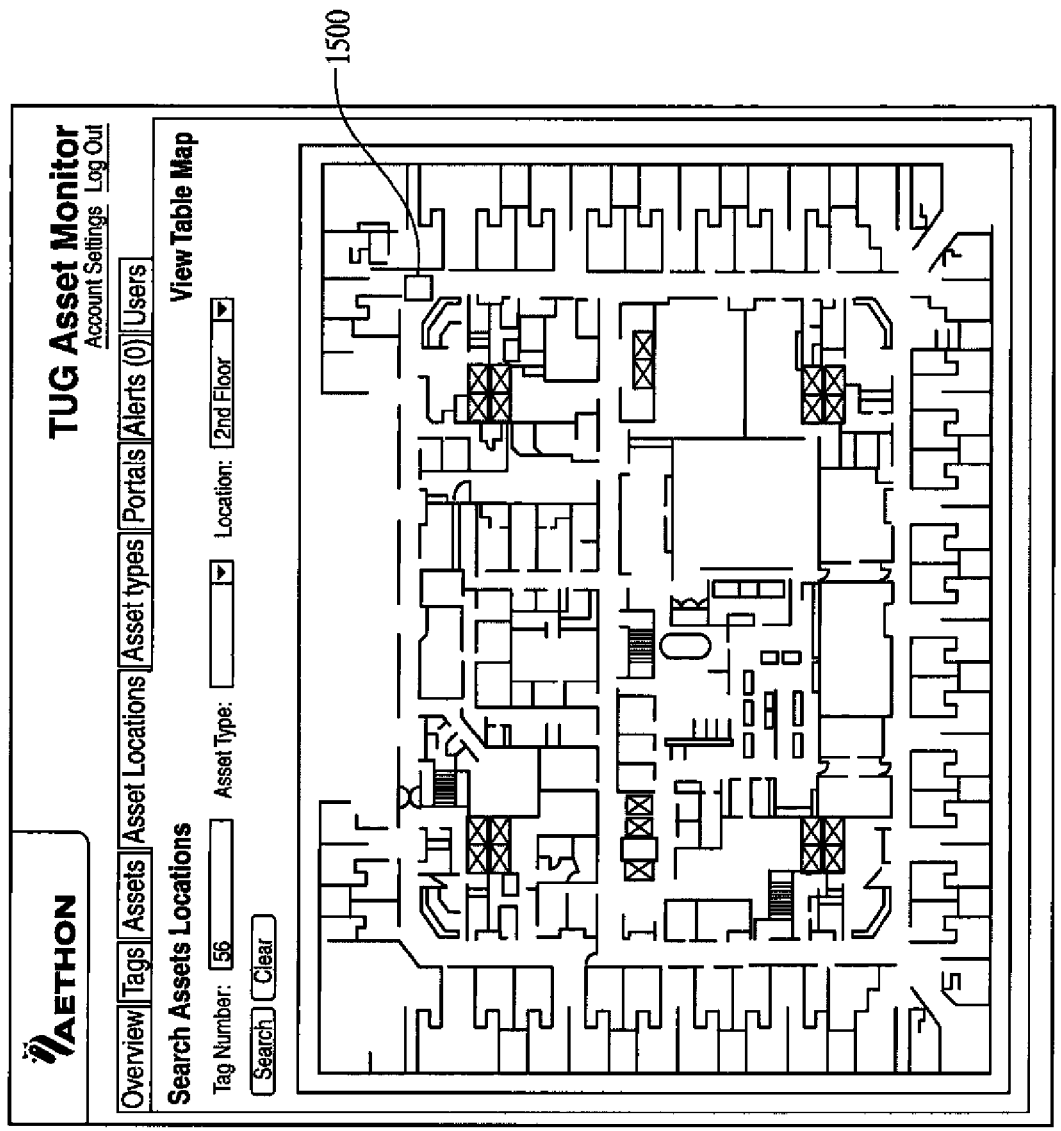
FIG. 15 is a screen shot of an asset located on a floor plan map.

Preferably, the asset management software includes a variety of features associated with the location of RFID-tagged assets. For example, once an asset is located, a map of the floor plan of the portion of the environment in which that asset was located may be presented to the user. For example, FIG. 15 depicts the floor plan of the $2^{nd}$ floor of a hospital in which a wheelchair with an RFID was located. Note in the upper right hand corner of the map the wheelchair icon 1500 which represents the location that the asset was last located with the highest confidence.

Figure 16:
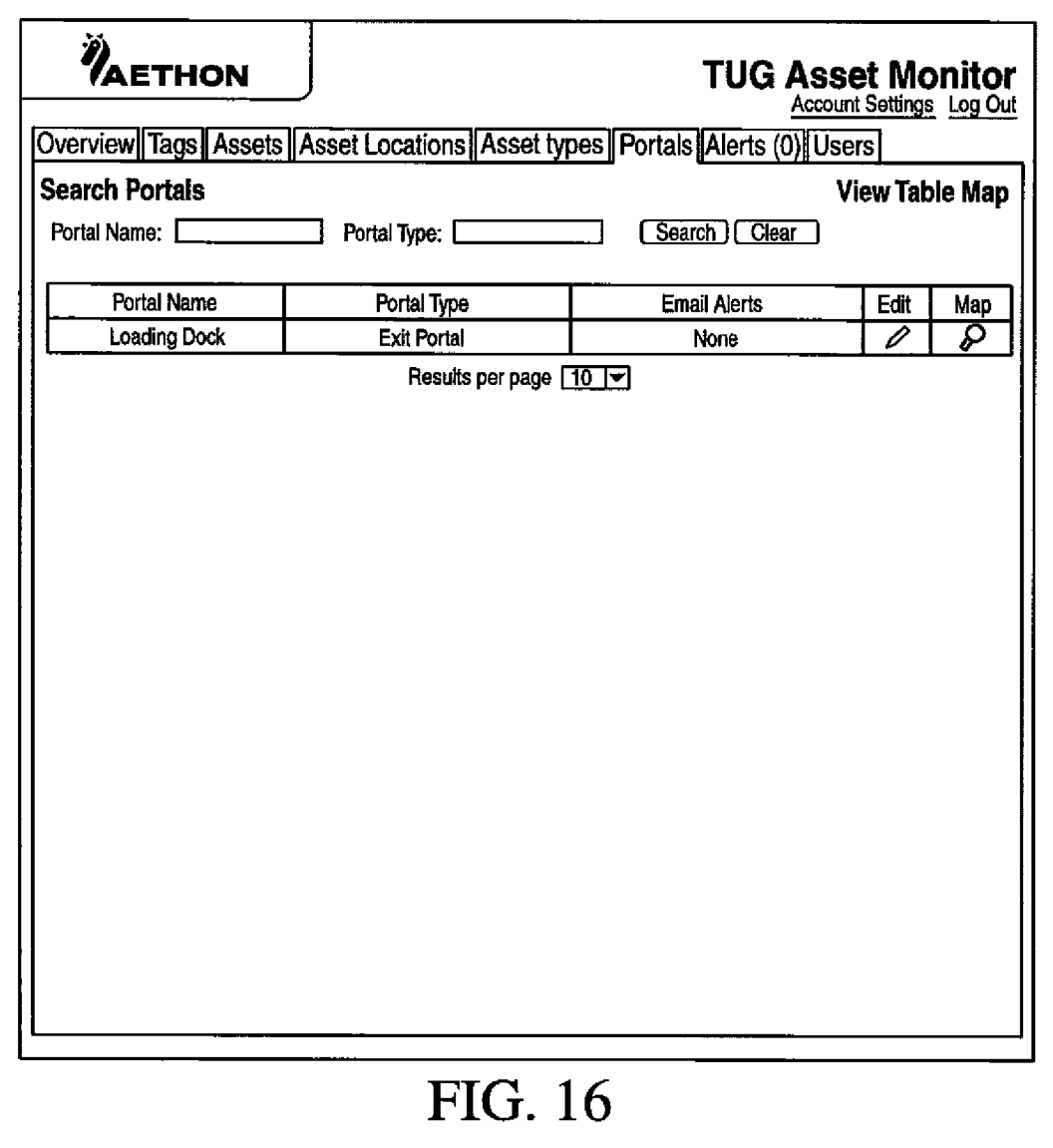

FIG. 16 details an asset management screen related to the use of "portals." As introduced above, a portal may be a fixed antenna installed at a doorway to the outside, a passageway between wings of a hospital or any other location at which an RFID-tagged asset may leave the general location in which the robotic device scans for tags. These portal scanners therefore indicate when assets are removed or introduced into the scanning environment and can be useful in preventing theft. As shown in FIG. 16, one or more email notifications or alerts may be associated with the use of either a portal, or a specific RFID tag passing through said portal. In this way, an appropriate person (an asset manager or security personnel) may be immediately informed when a valuable asset is leaving an area where it can me tracked. FIG. 17 shows another asset management screen in which various alerts/notifications can be assigned to the movement and/or detection of assets. For example, when a presumed lost asset is detected by the antenna on the tug/cart, an alert email may be sent indicating that the asset has been found.

As described above, this tailored asset management database and software is particularly useful to the presently described application and it may exist onboard the robot, on the home base computer or at any other location. However the RFID identification and RSSI data could also be exported to an existing third party asset management database in addition to or in place of the above-described software. The flexibility of the present system is again its touchstone.

Robot-to-Robot Interaction and Auto-Recovery

In addition to the above features, the wireless communications onboard each robot allows for robot-to-robot interaction. For example, when two robots are attempting to navigate down the same hallway, the robots may sense each other and one robot could be programmed to give way to the other robot and let it pass.

Also, multiple robots could be used as part of a circuit. For example, assume that a hospital intends to always have a laundry cart robot parked at a certain location. Periodically, a second (empty) laundry cart may approach that location to replace the existing laundry cart. By signaling to the parked robot, the parked robot could be prompted to bring its payload down to the hospital laundry (and then return). The approaching robot (which is empty) could then park at the same place that was just vacated.

Also, at some points in time. a tug/cart may lose track of its position and not be in a location with sufficient communications coverage (wireless network access) to be able to message a remote help desk or other administrator in order to receive direct aid. At these locations, there may be an "auto-recovery" area for the robot. In other words, there could be a sign on a wall and a corresponding location on the internal computer's maps that is a recovery zone or relocation zone for the tug/cart if it lost its position. Basically, the robotic device just needs to get near a position at which it can identify its location, and the robot will then be able to re-orient itself using its normal path adjustment algorithm.

Predefining certain recovery locations allows for this re-orientation method. For example, an RFID tag could be placed on the wall or a recognizable picture or pattern could be placed at the auto-recovery location and viewed by the tugs onboard camera. With this coarse location information, the tug/cart can re-orient itself to its internal maps even if it is in a location without sufficient communications coverage in order to be directly aided by the remote help desk or other administrator.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A method for creating and using a map to navigate a robot throughout a building, the method comprising the steps of:
    converting a drawing of a floor plan of the building into a scaled computer representation of said floor plan;
    electronically defining point locations within said scaled computer representation;
    electronically defining robot paths within said computer representation between said point locations;
    loading said scaled computer representation into said robot, wherein said loaded scaled computer representation includes the defined point locations and the defined robot paths; performing a check querying a local computer system to ensure a network is operational and elevators are in good working order; and
    navigating said robot based upon said defined robot paths within said loaded computer representation,
    wherein at least one of said electronically defined locations within said scaled computer representation represent elevators which are configured so that the robot is able to ride the elevators during the navigating step.

2. The method of claim 1, wherein at least one of said electronically defined locations represent robot destinations.

3. The method of claim 1, wherein at least one of said electronically defined locations represent checkpoints at which the robot confirms its position during the navigating step.

4. The method of claim 1, wherein at least one of said electronically defined locations represent automatic doors which the robot opens during the navigating step.

5. The method of claim 1, wherein at least one of said electronically defined locations represent annunciators which are triggered by the robot during the navigating step.

6. The method of claim 1, wherein said electronically defined paths are drawn with a freeform software tool.

7. The method of claim 1, wherein said electronically defined paths are assigned a speed limit which said robot adheres to during the navigating step.

8. The method of claim 1, where said steps of electronically defining locations and electronically defining robot paths is accomplished using a software program.

9. The method of claim 8, wherein said software program communicates with said robot from a remote location.

10. The method of claim 8, wherein said software program is adapted to receive data from said robot during the robot's navigating step.

11. The method of claim 8, wherein said software program is adapted to receive and display a video feed from said robot during the robot's navigating step.

12. The method of claim 1, wherein said navigating step comprises the steps of:
    receiving at least one indication of a final destination to which the robot intends to travel;
    determining a path on which to travel to said final destination based upon said computer representation; and
    generating a list of x,y coordinates which represent the path on said computer representation.

13. The method of claim 12, further comprising the step of:
    converting said list of x,y coordinates into heading and velocity signals.

14. The method of claim 12, further comprising the steps of:
    accepting at least a portion of sensor data from sensors onboard said robot; and
    adjusting the path in said determining step based on said sensor data.

15. The method of claim 14, wherein at least one of said sensors is an infrared sensor.

16. The method of claim 12 wherein said indication of a final destination is received from a remote host.

17. The method of claim 12, wherein said at least one indication of a final destination is a plurality of indications of more than one destination which are stored in said robot as a queue of destinations.

18. The method of claim 1, wherein navigating said robot comprises adjusting a velocity of the robot automatically based on information gathered by at least one onboard sensor.

19. A method for creating and using a map to navigate a robot throughout a building, the method comprising the steps of:
    converting a drawing of a floor plan of the building into a scaled computer representation of said floor plan;
    electronically defining point locations within said scaled computer representation;
    electronically defining robot paths within said computer representation between said point locations;
    loading said scaled computer representation into said robot, wherein said loaded scaled computer representation includes the defined point locations and the defined robot paths;
    navigating said robot based upon said defined robot paths within said loaded computer representation, wherein said navigating step comprises the steps of:
        receiving at least one indication of a final destination to which the robot intends to travel:
        determining a path on which to travel to said final destination based upon said computer representation; and
        generating a list of x,y coordinates which represent the path on said computer representation;
    accepting at least a portion of sensor data from sensors onboard said robot; and
    adjusting the path in said determining step based on said sensor data, wherein said sensor data includes information received directly from a second robot.

20. A method for creating and using a map to navigate a robot throughout a building, the method comprising the steps of:
    converting a drawing of a floor plan of the building into a scaled computer representation of said floor plan;

electronically defining point locations within said scaled computer representation;

electronically defining robot paths within said computer representation between said point locations;

loading said scaled computer representation into said robot, wherein said loaded scaled computer representation includes the defined point locations and the defined robot paths;

navigating said robot based upon said defined robot paths within said loaded computer representation;

receiving an indication of a final destination to which the robot intends to travel;

determining a first path of the robot paths on which the robot intends to travel to the final destination based upon the computer representation;

generating the first path on the computer representation;

determining that at least a portion of the first path is obstructed based on sensor data from sensors onboard said robot; and determining a second path on which to travel to the first destination based at least in part on the sensor data.

21. A method for creating and using a map to navigate a robot throughout a building, the method comprising the steps of:

converting a drawing of a floor plan of the building into a scaled computer representation of said floor plan;

electronically defining point locations within said scaled computer representation;

electronically defining robot paths within said computer representation between said point locations;

loading said scaled computer representation into said robot, wherein said loaded scaled computer representation includes the defined point locations and the defined robot paths; and navigating said robot based upon said defined robot paths within said loaded computer representation, wherein at least one of the electronically defined locations represents a docking station of the robot that provides docking functionality for the robot and at least one of the electronically defined locations represents a final destination of the robot, wherein navigating the robot comprises navigating the robot between the final destination and the docking station, and wherein the docking functionality comprises at least two of recharging batteries of the robot, downloading any collected data of the robot, performing a diagnostic self-check of the robot, providing an interface with which a user can select a desired destination.

* * * * *